(12) United States Patent
Uematsu

(10) Patent No.: US 10,337,921 B2
(45) Date of Patent: Jul. 2, 2019

(54) DIRECT-STIMULUS-VALVE-READING-TYPE COLORIMETRIC PHOTOMETER

(71) Applicant: KONICA MINOLTA, INC., Chiyoda-ku (JP)

(72) Inventor: Mikio Uematsu, Izumi (JP)

(73) Assignee: KONICA MINOLTA, INC., Tokyo (JP)

(*) Notice: Subject to any disclaimer, the term of this patent is extended or adjusted under 35 U.S.C. 154(b) by 73 days.

(21) Appl. No.: 15/527,055

(22) PCT Filed: Oct. 28, 2015

(86) PCT No.: PCT/JP2015/080436
§ 371 (c)(1),
(2) Date: May 16, 2017

(87) PCT Pub. No.: WO2016/080165
PCT Pub. Date: May 26, 2016

(65) Prior Publication Data
US 2017/0370774 A1    Dec. 28, 2017

(30) Foreign Application Priority Data

Nov. 19, 2014 (JP) ................... 2014-234703

(51) Int. Cl.
*G01J 3/51* (2006.01)
*G01J 1/04* (2006.01)
(Continued)

(52) U.S. Cl.
CPC ............... *G01J 3/465* (2013.01); *G01J 1/04* (2013.01); *G01J 3/0208* (2013.01); *G01J 3/0218* (2013.01); *G01J 3/505* (2013.01); *G01J 3/51* (2013.01); *G01J 3/513* (2013.01); *G01J 3/524* (2013.01); *G01M 11/0285* (2013.01); *G09G 5/02* (2013.01);
(Continued)

(58) Field of Classification Search
CPC ..................... G01J 3/46; G01J 3/505
See application file for complete search history.

(56) References Cited

U.S. PATENT DOCUMENTS 5,363,197 A * 11/1994 Ohno ................. G01J 3/50
348/179
5,742,296 A * 4/1998 Yamada ............. H04N 1/6058
345/604
(Continued)

FOREIGN PATENT DOCUMENTS

JP     53-60683     5/1978
JP     2-107928     4/1990
(Continued)

OTHER PUBLICATIONS

J.H. Wold, et al., The derivation of XYZ tristimulus spaces: A comparison of two alternative methods, Color Res. Appl. 2001, vol. 26, Issue S1, pp. S222-S224.

*Primary Examiner* — Maurice C Smith
(74) *Attorney, Agent, or Firm* — Cozen O'Connor

(57) ABSTRACT

In a direct stimulus value reading type colorimetric photometer, first, second, and third colorimetric optical systems have spectral responsivities approximate to first, second, and third parts of the color matching function, respectively. A deriving unit derives a colorimetric value corresponding to a case in which the color matching function is selected as an evaluation function for colorimetry and a photometric value corresponding to a case in which the spectral luminous efficiency is selected as an evaluation function for photometry (i.e. "CASE") from three signals. The spectral luminous efficiency is not consistent with any one of the first, second, and third parts. A fourth colorimetric optical system may have spectral responsivity approximate to the spectral luminous efficiency, and the deriving unit may derive the colorimetric value corresponding to the CASE from a fourth signal.

20 Claims, 19 Drawing Sheets

(51) Int. Cl.
    *G01J 3/46*       (2006.01)
    *G09G 5/02*       (2006.01)
    *H04N 1/60*       (2006.01)
    *G01M 11/02*      (2006.01)
    *G01J 3/50*       (2006.01)
    *G01J 3/52*       (2006.01)
    *G01J 3/02*       (2006.01)

(52) U.S. Cl.
    CPC .......... *H04N 1/603* (2013.01); *H04N 1/6033* (2013.01); *H04N 1/6052* (2013.01); *G09G 2320/0693* (2013.01)

(56) References Cited

U.S. PATENT DOCUMENTS

| | | | |
|---|---|---|---|
| 2009/0257648 A1 | 10/2009 | Edge | |
| 2010/0053647 A1* | 3/2010 | Baba | G01J 3/46 |
| | | | 358/1.9 |
| 2011/0025703 A1 | 2/2011 | Edge | |
| 2013/0099102 A1* | 4/2013 | Park | G01J 1/04 |
| | | | 250/208.2 |
| 2013/0120482 A1* | 5/2013 | Nishikawa | B41J 2/2114 |
| | | | 347/9 |

FOREIGN PATENT DOCUMENTS

| | | |
|---|---|---|
| JP | H 06323910 | 11/1994 |
| JP | 8-320273 | 12/1996 |
| JP | H 11006766 | 1/1999 |
| JP | 2008-180520 | 8/2008 |
| JP | 2009-50399 | 3/2009 |
| JP | 2010-243300 | 10/2010 |
| JP | 2011-13201 | 1/2011 |
| JP | 2011-517783 | 6/2011 |
| JP | 2011-220770 | 11/2011 |
| JP | 2014-109562 | 6/2014 |

\* cited by examiner

DIRECT-STIMULUS-VALVE-READING-TYPE COLORIMETRIC PHOTOMETER

RELATED APPLICATIONS

This is a U.S. National Phase Application under 35 USC 371 of International Application PCT/JP2015/080436 filed on Oct. 28, 2015.

This application claims the priority of Japanese application no. 2014-234703 filed Nov. 19, 2014, the entire content of which is hereby incorporated by reference.

TECHNICAL FIELD

The present invention relates to a direct stimulus value reading type colorimetric photometer that measures both a colorimetric value and a photometric value.

BACKGROUND ART

A color matching function of an XYZ color system adopted in 1931 by the International Commission on Illumination (CIE) (hereinafter referred to as a "CIE 1931 XYZ color matching function") is a type of evaluation function for colorimetry used to obtain an indicator of a color expressed by an objective numerical value. The CIE 1931 XYZ color matching function has been adopted over a long period of time as an evaluation function for standard colorimetry in the case of measuring a color of a display, a lamp, etc. Patent Literature 1 is an example thereof.

However, a colorimetric value obtained when the CIE 1931 XYZ color matching function is selected as an evaluation function for colorimetry may not be consistent with an actual human visual sense as described in Patent Literature 2. For this reason, a color matching function obtained by modifying the CIE 1931 XYZ color matching function (hereinafter referred to as a "modified color matching function") has been proposed. For example, a Vos and Judd (1978) modified color matching function, a TR-170-1 modified color matching function, a Stockman and Sharpe (1998) modified color matching function, etc. have been proposed. A colorimetric value obtained when the modified color matching function is selected as the evaluation function for colorimetry is more likely to be consistent with an actual human visual sense when compared to a colorimetric value obtained when the CIE 1931 XYZ color matching function is selected as the evaluation function for colorimetry.

A spectral luminous efficiency determined by the CIE in 1924 (hereinafter referred to as a "standard spectral luminous efficiency") is a type of evaluation function for photometry. The standard spectral luminous efficiency has been adopted as an evaluation function for photometry over a long period of time. The standard spectral luminous efficiency is consistent with a y component of the CIE 1931 XYZ color matching function. Therefore, a photometric value corresponding to a case in which the standard spectral luminous efficiency is selected as the evaluation function for photometry may be accurately derived from a y component of a stimulus value corresponding to a case in which the CIE 1931 XYZ color matching function is selected as the evaluation function for colorimetry.

Patent Literature 3 describes an invention in which a discrepancy between a spectral responsivity of a colorimetric optical system and a color matching function is alleviated by calculating a weighted sum of three signal values.

CITATION LIST

Patent Literature

Patent Literature 1: JP 11-6766 A
Patent Literature 2: JP 2011-517783 A
Patent Literature 3: JP 6-323910 A

SUMMARY OF INVENTION

Technical Problem

As described above, a colorimetric value obtained when a modified color matching function is selected as an evaluation function for colorimetry is more likely to be consistent with an actual human visual sense when compared to a colorimetric value obtained when a CIE 1931 XYZ color matching function is selected as the evaluation function for colorimetry. For this reason, in some cases, it is desirable to select the modified color matching function as the evaluation function for colorimetry and measure a colorimetric value.

Meanwhile, a standard spectral luminous efficiency has occupied a position of a standard evaluation function for photometry over a long period of time. Thus, in some cases, it is desirable to select the standard spectral luminous efficiency as the evaluation function for photometry and measure a photometric value for comparison with past measurement data, etc.

Here, a problem arises such that while a photometric value corresponding to a case in which the standard spectral luminous efficiency is selected as the evaluation function for photometry may be accurately derived from a y component of a stimulus value corresponding to a case in which the CIE 1931 XYZ color matching function is selected as the evaluation function for colorimetry, the photometric value corresponding to the case in which the standard spectral luminous efficiency is selected as the evaluation function for photometry may not be accurately derived from a y component of a stimulus value corresponding to a case in which the modified color matching function is selected as the evaluation function for colorimetry.

This problem generally arises when both a colorimetric value corresponding to a case in which the color matching function is selected as the evaluation function for colorimetry and a photometric value corresponding to a case in which the spectral luminous efficiency is selected as the evaluation function for photometry are measured when the spectral luminous efficiency is not approximate to a part of the color matching function.

An object of the invention described in a detailed description of the invention is to solve the above problem. The problem to be solved by the invention described in the detailed description of the invention is to accurately measure both a colorimetric value corresponding to a case in which the color matching function is selected as the evaluation function for colorimetry and a photometric value corresponding to a case in which the spectral luminous efficiency is selected as the evaluation function for photometry using a direct stimulus value reading type colorimetric photometer even when the spectral luminous efficiency is not approximate to a part of the color matching function.

Solution to Problem

In a direct stimulus value reading type colorimetric photometer, a first colorimetric optical system, a second colorimetric optical system, and a third colorimetric optical system included in a colorimetric optical system group have spectral responsivities approximate to a first part, a second part, and a third part of a color matching function, respectively, and output a first signal, a second signal, and a third signal having intensities depending on spectral intensity of light to be measured, respectively. A deriving unit derives a colorimetric value corresponding to a case in which the color matching function is selected as an evaluation function for colorimetry and a photometric value corresponding to a case in which spectral luminous efficiency is selected as an evaluation function for photometry from at least three signals. The spectral luminous efficiency is not consistent with any one of the first part, the second part, and the third part.

These and other objects, features, aspects and advantages of the invention will become more apparent in a detailed description of the invention below when considered in conjunction with accompanying drawings.

DESCRIPTION OF EMBODIMENTS

1 First Embodiment 1.1 Color Matching Function and Spectral Luminous Efficiency

A color luminance meter of a first embodiment measures both chromaticities x' and y' corresponding to a case in which a modified color matching function is selected as an evaluation function for colorimetry and luminance Lv corresponding to a case in which standard spectral luminous efficiency is selected as an evaluation function for photometry. In description below, a CIE 1931 XYZ color matching function, the modified color matching function, and the standard spectral luminous efficiency will be described prior to a description of the color luminance meter.

The evaluation function for colorimetry indicates a magnitude of contribution of each wavelength component of light to be measured to a colorimetric value and is expressed as a function of wavelength. A colorimetric value is obtained by integrating a product of the evaluation function for colorimetry and the spectral intensity with respect to wavelength and further multiplying by a coefficient as necessary.

The evaluation function for photometry indicates a magnitude of contribution of each wavelength component of light to be measured to a photometric value and is expressed as a function of wavelength. A photometric value is obtained by integrating a product of the evaluation function for photometry and the spectral intensity with respect to wavelength and further multiplying by a coefficient as necessary.

1.2 CIE 1931 XYZ Color Matching Function

Figure 1:
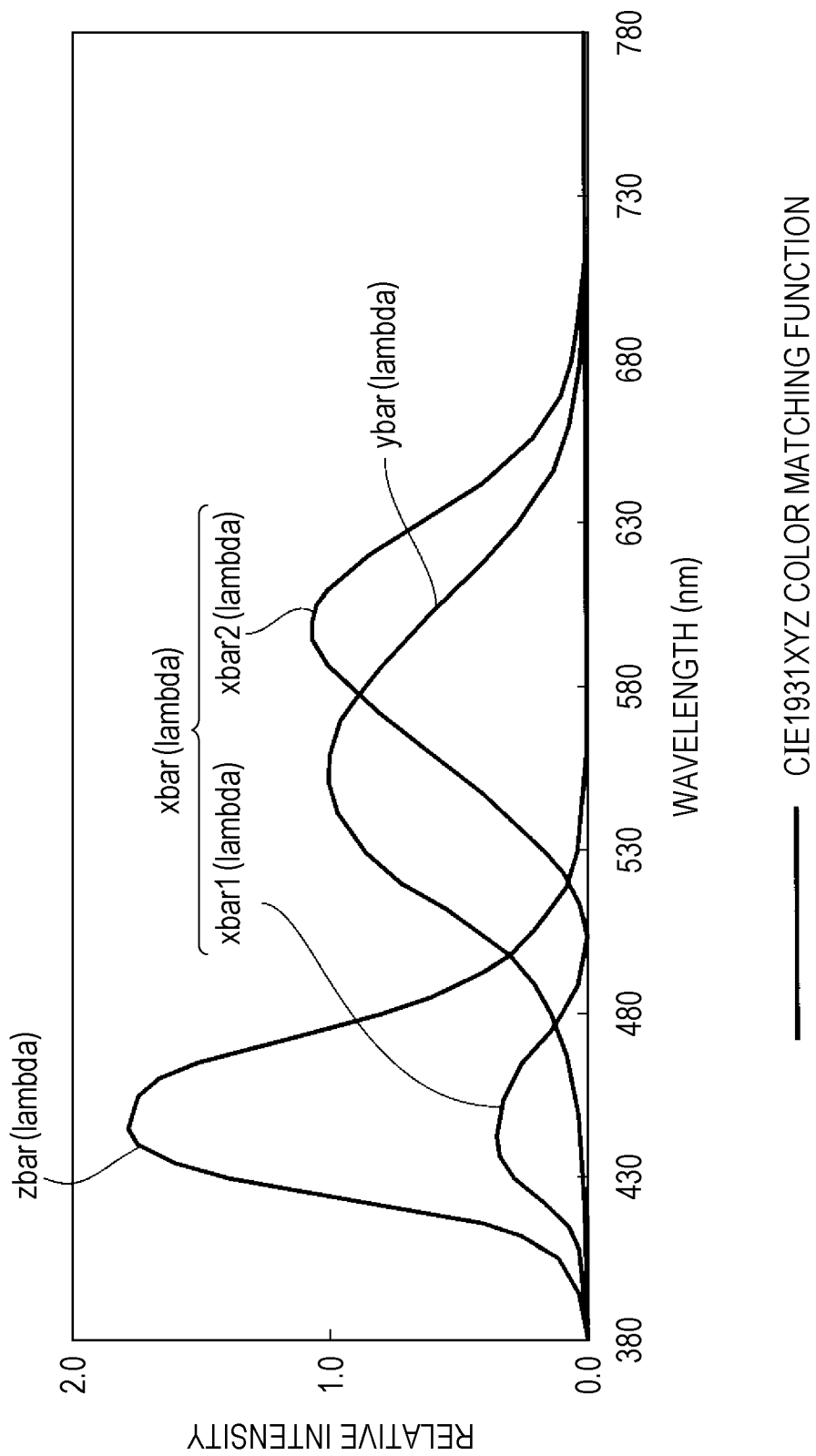
FIG. 1 is a graph illustrating a CIE 1931 XYZ color matching function.

A graph of FIG. 1 illustrates the CIE 1931 XYZ color matching function.

As illustrated in FIG. 1, the CIE 1931 XYZ color matching function has an x component xbar(lambda), a y component ybar(lambda) and a z component zbar(lambda). The x component xbar(lambda), the y component ybar(lambda) and the z component zbar(lambda) are functions of wavelength lambda. The x component xbar(lambda) has peaks around 442 nm and around 599 nm. The y component ybar(lambda) has a peak around 555 nm. The z component zbar(lambda) has a peak around 446 nm. The x component xbar(lambda) may be divided into a short wavelength side xbar1(lambda) and a long wavelength side xbar2(lambda). The short wavelength side xbar1(lambda) is a part of a wavelength range including the peak on the short wavelength side and not including the peak on the long wavelength side in the x component xbar(lambda), and is, for example, a part of a wavelength range less than or equal to 500 nm. The long wavelength side xbar2(lambda) is a part of a wavelength range including the peak on the long wavelength side and not including the peak on the short wavelength side in the x component xbar(lambda), and is, for example, a part of a wavelength range greater than or equal to 500 nm. For example, a boundary between the short wavelength side xbar1(lambda) and the long wavelength side xbar2(lambda) is 490 nm or more and 510 nm or less.

Stimulus values X, Y, and Z in an XYZ color system corresponding to a case in which the CIE 1931 XYZ color matching function is selected as the evaluation function for colorimetry are calculated using Formulas (1), (2), and (3) below, respectively, using a coefficient k and a spectral radiance L(lambda) of light to be measured. An appropriate unit is assigned to the stimulus values X, Y and Z by multiplying by the coefficient k.

[Formula 1]

$$X = k \int L(\text{lambda}) \cdot x\text{bar}(\text{lambda}) d\text{lambda} \tag{1}$$

$$Y = k \int L(\text{lambda}) \cdot y\text{bar}(\text{lambda}) d\text{lambda} \tag{2}$$

$$Z = k \int L(\text{lambda}) \cdot z\text{bar}(\text{lambda}) d\text{lambda} \tag{3}$$

Chromaticities x and y in a Yxy color system corresponding to the case in which the CIE 1931 XYZ color matching function is selected as the evaluation function for colorimetry are calculated using the following Formulas (4) and (5).

[Formula 2]

$$x = \frac{X}{X+Y+Z} \quad (4)$$

$$y = \frac{Y}{X+Y+Z} \quad (5)$$

1.3 Modified Color Matching Function

Similarly to the CIE 1931 XYZ color matching function, the modified color matching function has an x component xbar'(lambda), a y component ybar'(lambda) and a z component zbar'(lambda). The x component xbar'(lambda), the y component ybar'(lambda) and the z component zbar'(lambda) of the modified color matching function replace the x component xbar(lambda), the y component ybar(lambda) and the z component zbar(lambda) of the CIE 1931 XYZ color matching function, respectively. Similarly to xbar(lambda) of the CIE 1931 XYZ color matching function, the x component xbar'(lambda) of the modified color matching function may be divided into a short wavelength side xbar1'(lambda) and a long wavelength side xbar2'(lambda).

1.4 Comparison Between CIE 1931 XYZ Color Matching Function and Modified Color Matching Function The modified color matching function is significantly different from the CIE 1931 XYZ color matching function in a wavelength range of 500 nm or less, particularly in a wavelength range from 400 nm to 500 nm, and is not significantly different from the CIE 1931 XYZ color matching function in a wavelength range of 500 nm or more.

For this reason, the short wavelength side xbar1'(lambda) of the x component xbar'(lambda) of the modified color matching function having large relative intensity in the wavelength range of 500 nm or less is significantly different from the short wavelength side xbar1(lambda) of the x component xbar(lambda) of the CIE 1931 XYZ color matching function. In addition, the z component zbar'(lambda) of the modified color matching function is significantly different from the z component zbar(lambda) of the CIE 1931 XYZ color matching function.

Meanwhile, the long wavelength side xbar2'(lambda) of the x component xbar'(lambda) of the modified color matching function is not significantly different from the long wavelength side xbar2(lambda) of the x component xbar(lambda) of the CIE 1931 XYZ color matching function, but is modified from the long wavelength side xbar2(lambda) of the x component xbar(lambda) of the CIE 1931 XYZ color matching function. In addition, the y component ybar'(lambda) of the modified color matching function is not significantly different from the y component ybar(lambda) of the CIE 1931 XYZ color matching function, but is modified from the y component ybar(lambda) of the CIE 1931 XYZ color matching function.

These points will be described using a Vos and Judd (1978) modified color matching function and a TR-170-1 modified color matching function as examples.

Figure 2:
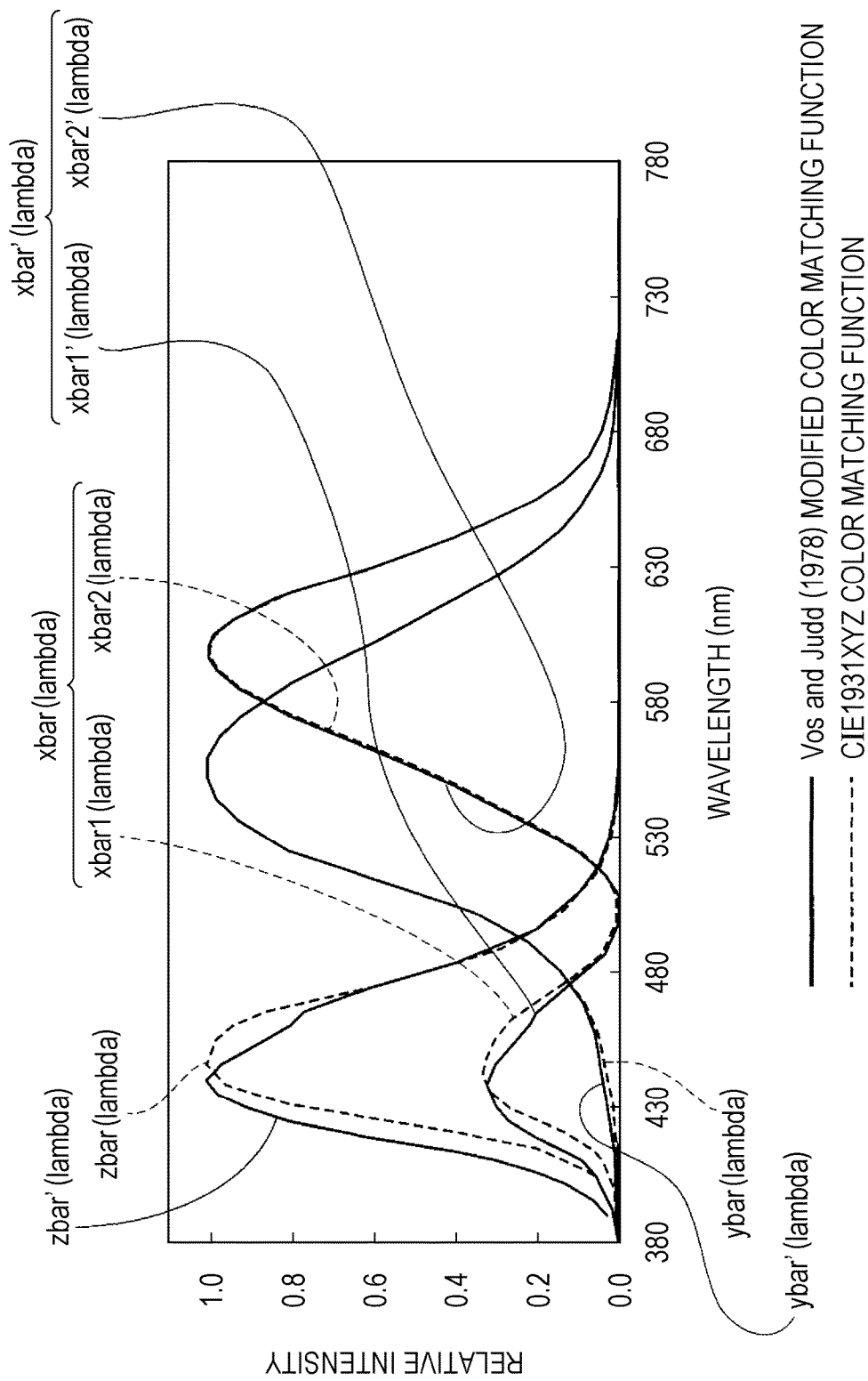
FIG. 2 is a graph illustrating a Vos and Judd (1978) modified color matching function and the CIE 1931 XYZ color matching function.

A graph of FIG. 2 illustrates the Vos and Judd (1978) modified color matching function and the CIE 1931 XYZ color matching function. A graph of FIG. 3 illustrates the TR-170-1 modified color matching function and the CIE 1931 XYZ color matching function.

As illustrated in FIG. 2, a short wavelength side xbar1'(lambda) of an x component xbar'(lambda) of the Vos and Judd (1978) modified color matching function is significantly different from a short wavelength side xbar1(lambda) of the x component xbar(lambda) of the CIE 1931 XYZ color matching function. In addition, a z component zbar'(lambda) of the Vos and Judd (1978) modified color matching function is significantly different from the z component zbar(lambda) of the CIE 1931 XYZ color matching function.

However, a long wavelength side xbar2'(lambda) of the x component xbar'(lambda) of the Vos and Judd (1978) modified color matching function is not significantly different from the long wavelength side xbar2(lambda) of the x component xbar(lambda) of the CIE 1931 XYZ color matching function, but is modified from the long wavelength side xbar2(lambda) of the x component xbar(lambda) of the CIE 1931 XYZ color matching function. In addition, a y component ybar'(lambda) of the Vos and Judd (1978) modified color matching function is not significantly different from the y component ybar(lambda) of the CIE 1931 XYZ color matching function, but is modified from the y component ybar(lambda) of the CIE 1931 XYZ color matching function.

Figure 3:
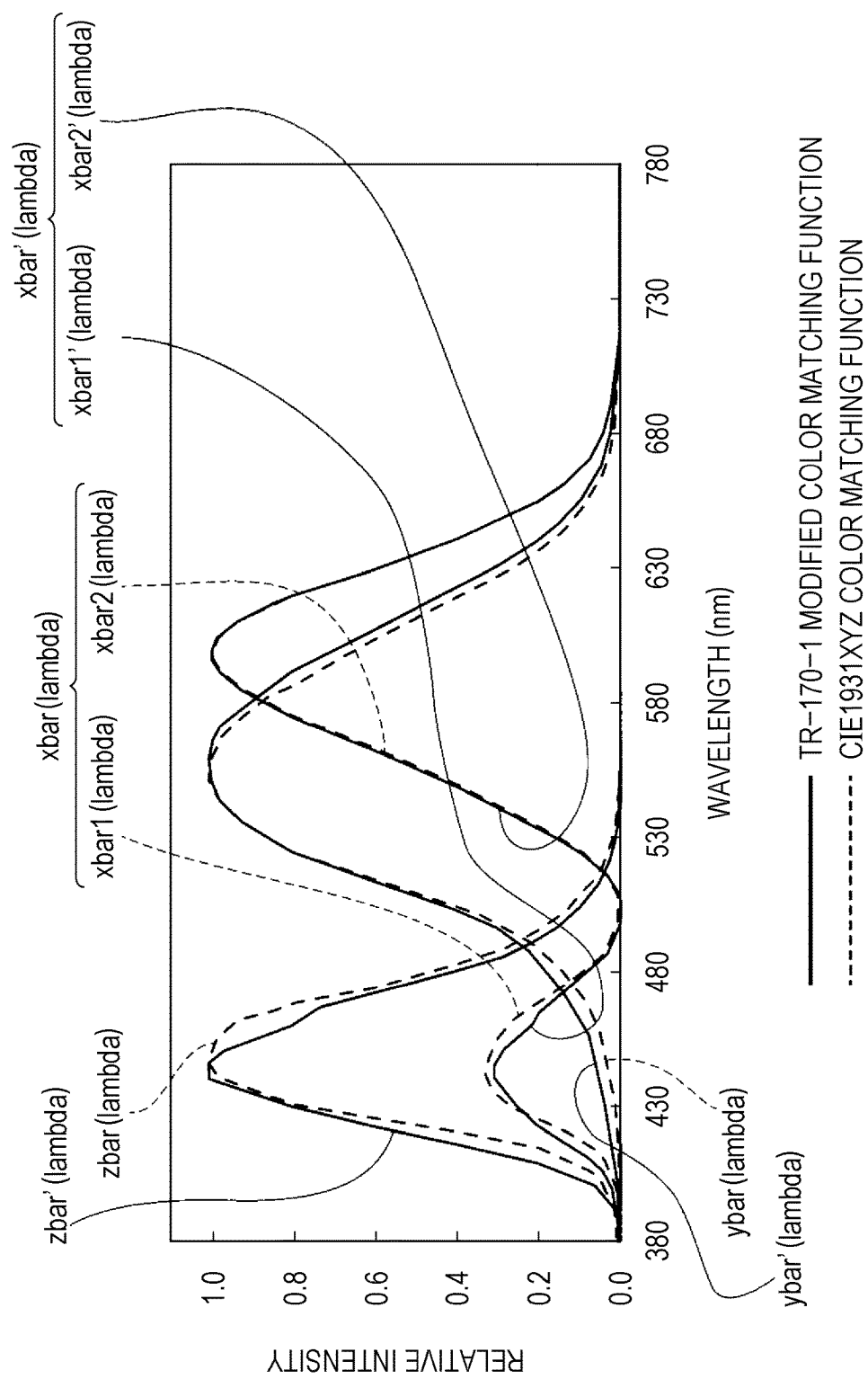
FIG. 3 is a graph illustrating a TR-170-1 modified color matching function and the CIE 1931 XYZ color matching function.

As illustrated in FIG. 3, the above description is similarly applied to the TR-170-1 modified color matching function.

1.5 Standard Spectral Luminous Efficiency

Figure 4:
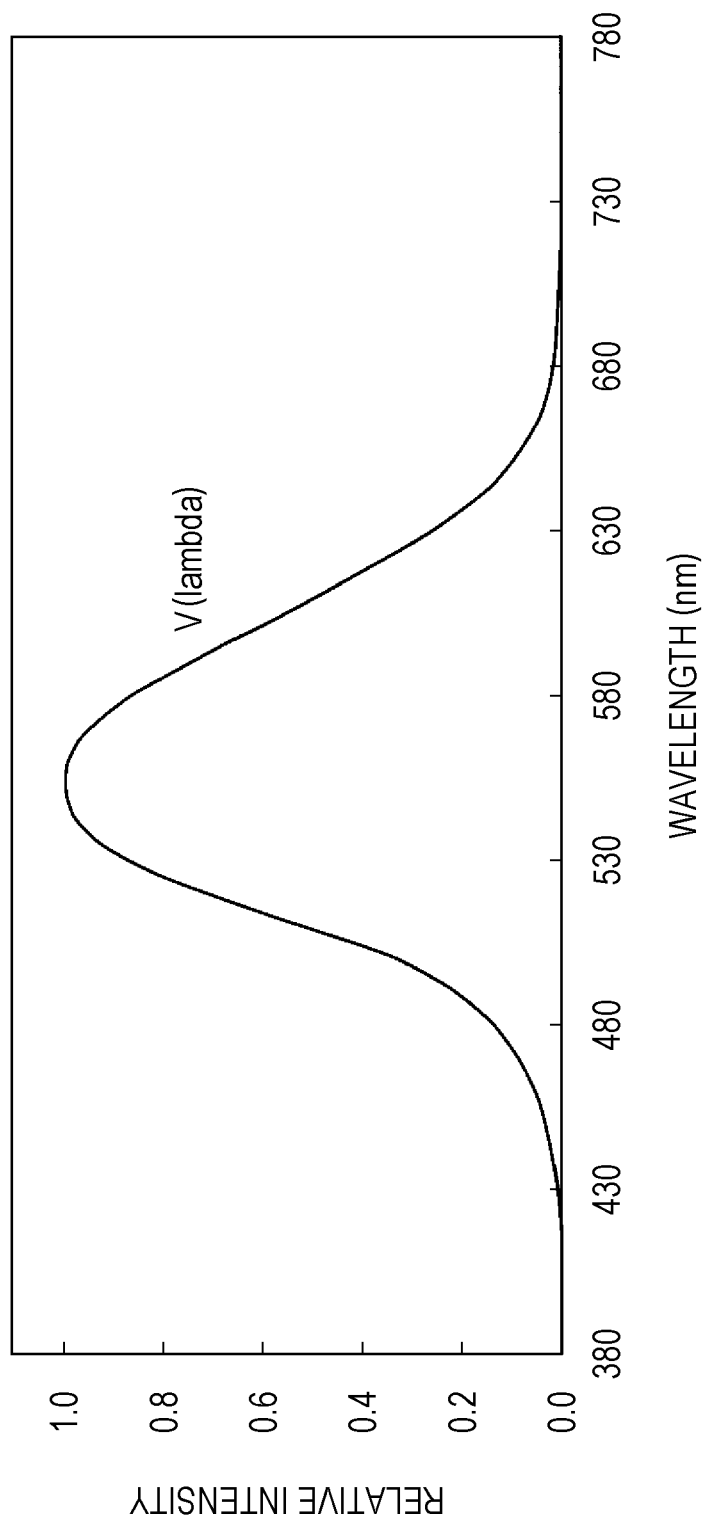
FIG. 4 is a graph illustrating a standard spectral luminous efficiency.

A graph of FIG. 4 illustrates a standard spectral luminous efficiency.

As illustrated in FIG. 4, a standard spectral luminous efficiency V(lambda) is consistent with the y component ybar(lambda) of the CIE 1931 XYZ color matching function, but is inconsistent with the y component ybar'(lambda) of the modified color matching function. For this reason, even though accurate luminance Lv may be derived from a signal output by a colorimetric optical system having a spectral responsivity approximate to the y component ybar (lambda) of the CIE 1931 XYZ color matching function, accurate luminance Lv may not be derived from a signal output by a colorimetric optical system having a spectral responsivity approximate to the y component ybar'(lambda) of the modified color matching function. In addition, the standard spectral luminous efficiency V(lambda) is inconsistent with any of the x component xbar'(lambda) and the z component zbar'(lambda) of the modified color matching function. For this reason, the luminance Lv may not be derived from a signal output by the colorimetric optical system having a spectral responsivity approximate to the x component xbar'(lambda) or zbar'(lambda) of the modified color matching function.

Luminance Lv in the Yxy color system is calculated by Formula (6) below using a maximum luminous effect degree Km and a spectral radiance L(lambda) of light to be measured. A luminance unit is assigned to the luminance Lv by multiplying by the maximum luminous effect degree Km.

[Formula 3]

$$Lv = Km\!\int\! L(\text{lambda}) \cdot V(\text{lambda}) d\text{lambda} \quad (6)$$

Since the standard spectral luminous efficiency V(lambda) is consistent with the y component ybar(lambda)

of the CIE 1931 XYZ color matching function, the above Formula (6) is rewritten as the following Formula (7).

[Formula 4]

$$Lv = Km \int L(\lambda) \cdot \bar{y}(\lambda) d\lambda \quad (7)$$

The above Formula (7) is rewritten as Formula (8) below using Formula (2).

[Formula 5]

$$Lv = Km \cdot \frac{Y}{k} \quad (8)$$

1.6 Part Used to Derive Colorimetric Value

In description below, the x component xbar'(lambda), the y component ybar'(lambda), and the z component zbar'(lambda) are extracted from the modified color matching function as a first part, a second part, and a third part, respectively, necessary to derive the chromaticities x' and y'. Extraction locations of the first part, the second part, and the third part from the modified color matching function may be changed when the chromaticities x' and y' may be derived from the first part, the second part, and the third part. For example, the long wavelength side xbar2'(lambda) of the x component xbar'(lambda), the y component ybar'(lambda), and the z component zbar'(lambda) may be extracted from the modified color matching function as the first part, the second part, and the third part, respectively. The long wavelength side xbar2'(lambda) of the x component xbar'(lambda) may be extracted in place of the x component xbar'(lambda) since the short wavelength side xbar1'(lambda) of the x component xbar'(lambda) may be approximated by a multiple of a coefficient of the z component zbar'(lambda).

1.7 Color Luminance Meter

Figure 5:
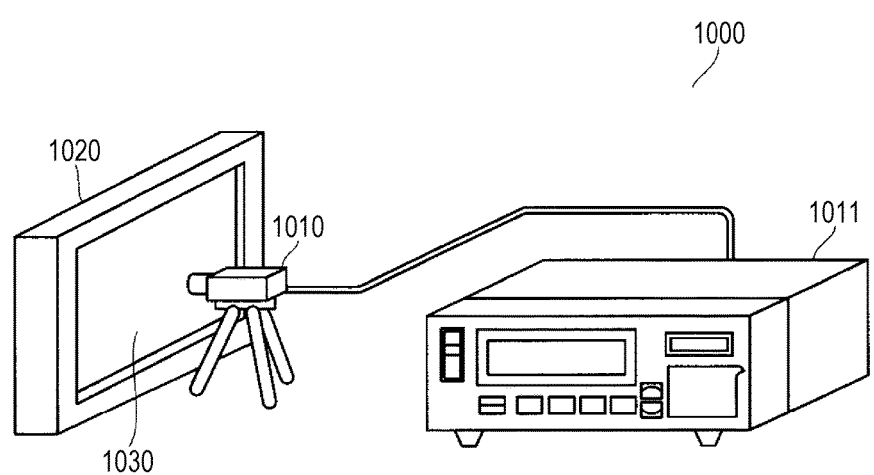
FIG. 5 is a schematic view of a color luminance meter.

A schematic view of FIG. 5 illustrates a color luminance meter 1000 of the first embodiment.

As illustrated in FIG. 5, the color luminance meter 1000 includes a measurement probe 1010 and a measuring instrument body 1011.

The color luminance meter 1000 measures a color of a display surface 1030 of a liquid crystal display 1020. The color luminance meter 1000 may measure a color of a display surface of a flat panel display other than the liquid crystal display 1020. The color luminance meter 1000 may measure a color of a luminescent object other than the flat panel display. The color luminance meter 1000 may measure a color of a non-luminescent object.

The color luminance meter 1000 measures the chromaticities x' and y' and the luminance Lv in the Yxy color system. The device may be referred to as another name other than the color luminance meter depending on an object of measurement, a measured colorimetric value, a measured photometric value, accuracy of measurement, etc. For example, when the measured photometric value is illuminance, the device is referred to as a color illuminance meter. In this application document, devices for measuring the colorimetric value and the photometric value are collectively referred to as a colorimetric photometer. A colorimetric value other than chromaticity may be measured by the colorimetric photometer. For example, it is possible to measure a lightness index and a chromatics index in an L*a*b* color system, a lightness index, a chroma, and a hue angle in an L*C*h color system, a hue, brightness, and a chroma in the Munsell color system, a lightness index and a chromatics index in an L*u*v* color system, a stimulus value in the XYZ color system, a stimulus value and a color temperature in an RGB color system, etc. A color difference may be measured. A photometric value other than illuminance may be measured in the colorimetric photometer. For example, illuminance, a luminous flux, luminosity, etc. may be measured. The color luminance meter 1000 is a type of direct stimulus value reading type colorimetric photometer that measures a colorimetric value and a photometric value using a direct stimulus value reading scheme.

The measurement probe 1010 is disposed in a measurement posture in front of the display surface 1030 of the liquid crystal display 1020 when measurement is performed. When the measurement probe 1010 is disposed in the measurement posture, the measurement probe 1010 faces the display surface 1030, and light to be measured emitted from the display surface 1030 is incident on the measurement probe 1010.

When the measuring instrument body 1011 detects that an operation is performed, the measuring instrument body 1011 transmits a control signal for causing the measurement probe 1010 to perform processing according to the detected operation to the measurement probe 1010. When the measurement probe 1010 receives the control signal, the measurement probe 1010 performs processing according to the control signal to detect intensities of an X component, a Y component and a Z component of light to be measured, and output signal values X'c, Y'c and Z'c expressing the intensities of the X component, the Y component and the Z component of the light to be measured, respectively, to the measuring instrument body 1011. When the signal values X'c, Y'c and Z'c are input, the measuring instrument body 1011 derives the chromaticities x' and y' from the signal values X'c, Y'c and Z'c, and displays the chromaticities x' and y'. In addition, when the signal values X'c, Y'c and Z'c are input, the measuring instrument body 1011 derives the luminance Lv from the signal values X'c, Y'c and Z'c, and displays the luminance Lv. The measurement probe 1010 may perform all or some of functions of the measuring instrument body 1011. The measuring instrument body 1011 may perform some of functions of the measurement probe 1010. When the measurement probe 1010 performs all the functions of the measuring instrument body 1011, the measuring instrument body 1011 may be omitted and the measurement probe 1010 may be stand-alone. The measurement probe 1010 may be referred to as a measurement head, a sensor head, etc. in some cases.

1.8 Measurement Probe

Figure 6:
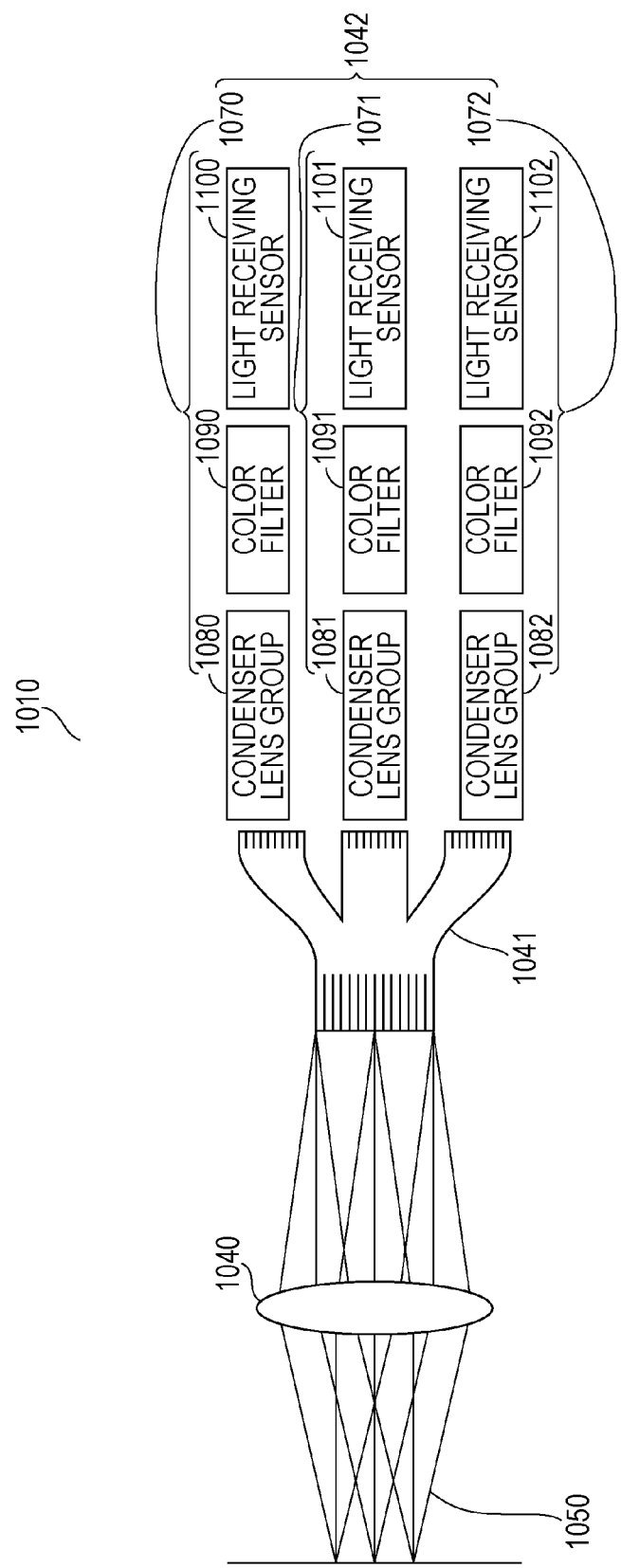
FIG. 6 is a schematic view of an optical system of a measurement probe.

A schematic view of FIG. 6 illustrates an optical system of the measurement probe 1010. A block diagram of FIG. 7 illustrates an electrical system of the measurement probe 1010 and the measuring instrument body 1011.

Figure 7:
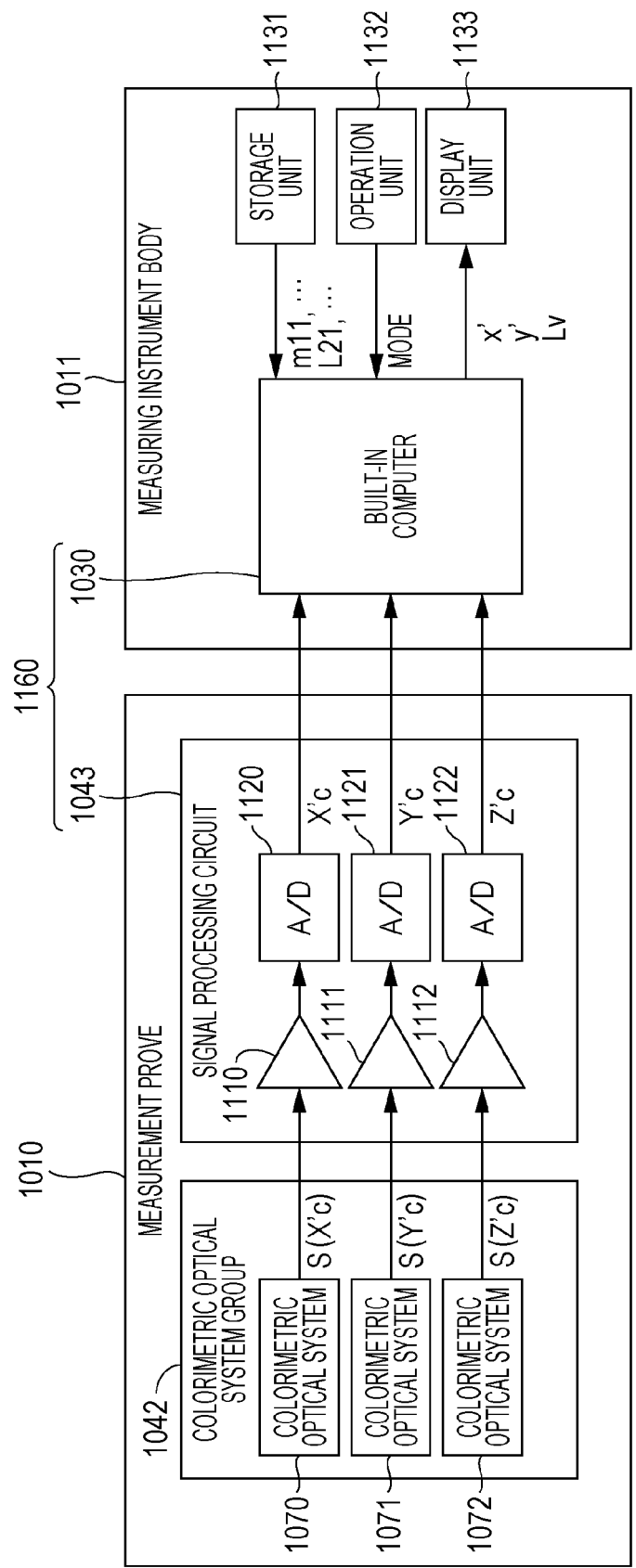
FIG. 7 is a block diagram of an electrical system of the measurement probe and a measuring instrument body.

As illustrated in FIG. 6 and FIG. 7, the measurement probe 1010 includes an objective optical system 1040, a branching optical system 1041, a colorimetric optical system group 1042, a signal processing circuit 1043, etc.

Light to be measured 1050 is converged by the objective optical system 1040 such as a lens, branched by the branching optical system 1041 such as a bundle fiber, and received by the colorimetric optical system group 1042. In some cases, the light to be measured 1050 is diverged or collimated by the objective optical system 1040. The light to be measured 1050 may pass through an optical system other than the objective optical system 1040 and the branching optical system 1041. Both or one of the objective optical system 1040 and the branching optical system 1041 may be omitted.

The colorimetric optical system group 1042 outputs signals S(X'c), S(Y'c), and S(Z'c).

When the signals S(X'c), S(Y'c), and S(Z'c) are input, the signal processing circuit 1043 processes the signals S(X'c), S(Y'c), and S(Z'c), obtains signal values X'c, Y'c and Z'c expressing intensities of the signals S(X'c), S(Y'c), and S(Z'c), respectively, and transmits the signal values X'c, Y'c and Z'c to the measuring instrument body 1011.

1.9 Colorimetric Optical System Group

The colorimetric optical system group 1042 includes colorimetric optical systems 1070, 1071, and 1072. The colorimetric optical systems 1070, 1071, and 1072 include condenser lens groups 1080, 1081, and 1082, respectively, color filters 1090, 1091, and 1092, respectively, and light receiving sensors 1100, 1101, and 1102, respectively.

When the colorimetric optical system group 1042 receives a pencil of light, the respective colorimetric optical systems 1070, 1071, and 1072 receive pencils of light branched by the branching optical system 1041. The pencils of light received by the colorimetric optical systems 1070, 1071, and 1072 are condensed by the condenser lens groups 1080, 1081, and 1082, respectively, transmitted through the color filters 1090, 1091, and 1092, respectively, and received by the light receiving sensors 1100, 1101, and 1102, respectively. The condenser lens groups 1080, 1081, and 1082 may not omitted.

The light receiving sensor 1100 outputs the signal S(X'c). Intensity of the signal S(X'c) corresponds to spectral intensity of the light to be measured 1050. A spectral responsivity indicating a relation between the spectral intensity of the light to be measured 1050 and the intensity of the signal S(X'c) is approximate to the x component xbar'(lambda) of the modified color matching function.

The light receiving sensor 1101 outputs the signal S(Y'c). Intensity of the signal S(Y'c) corresponds to spectral intensity of the light to be measured 1050. A spectral responsivity indicating a relation between the spectral intensity of the light to be measured 1050 and the intensity of the signal S(Y'c) is approximate to the y component ybar'(lambda) of the modified color matching function.

The light receiving sensor 1102 outputs the signal S(Z'c). Intensity of the signal S(Z'c) corresponds to spectral intensity of the light to be measured 1050. A spectral responsivity indicating a relation between the spectral intensity of the light to be measured 1050 and the intensity of the signal S(Z'c) is approximate to the z component zbar'(lambda) of the modified color matching function.

The fact that the spectral responsivity is approximated to the color matching function means that the spectral responsivity reflects the color matching function such that a difference between a colorimetric value derived from a signal output from a colorimetric optical system having the spectral responsivity and a real colorimetric value satisfies a specification related to an error of the color luminance meter.

1.10 Spectral Transmittance of Color Filter

Figure 8:
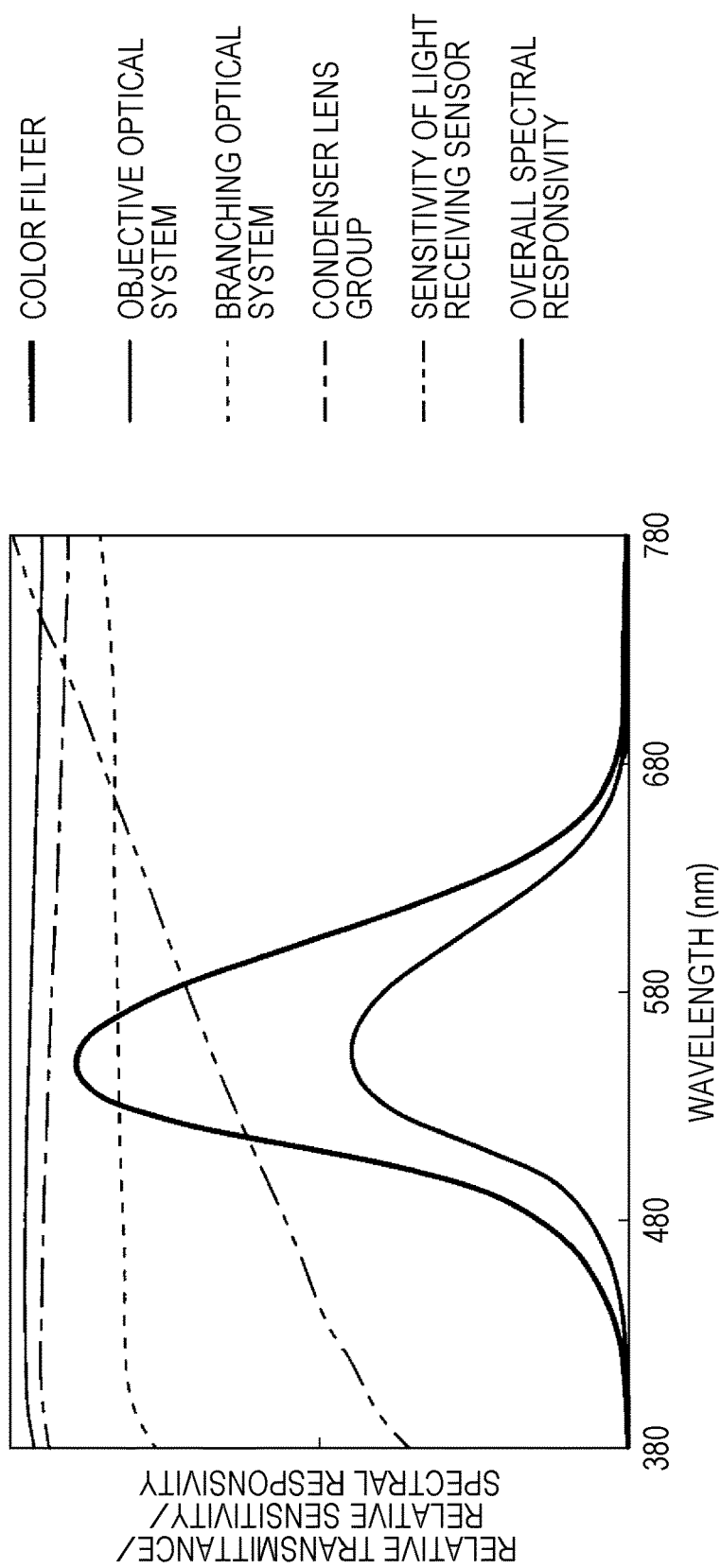
FIG. 8 is a graph illustrating a spectral transmittance, etc. of a color filter.

A graph of FIG. 8 illustrates a spectral transmittance of the color filter, a spectral transmittance of the objective optical system, a spectral transmittance of the branching optical system, a spectral transmittance of the condenser lens group, a spectral sensitivity of the light receiving sensor, and an overall spectral responsivity.

As illustrated in FIG. 8, a transmittance of the objective optical system, a transmittance of the branching optical system, a transmittance of the condenser lens group, a sensitivity of the light receiving sensor depend on wavelength. Thus, the whole spectral responsivity indicating a relation between the spectral intensity of the light to be measured and the intensity of the signal output by the light receiving sensor is not determined only by the spectral transmittance of the color filter, and is influenced by the spectral transmittance of the objective optical system, the spectral transmittance of the branching optical system, and the spectral transmittance of the condenser lens group. For example, the whole spectral responsivity is influence by a spectral transmittance of a lens included in the objective optical system, a spectral transmittance of a band filter included in the branching optical system, etc. When the light to be measured passes through an optical system other than the objective optical system, the branching optical system, and the condenser lens group, the whole spectral responsivity is influence by a spectral transmittance of the optical system. The whole spectral responsivity may be influence by another factor in some cases. For example, the whole spectral responsivity may be influenced by a spectral reflectance of a light receiving surface of the light receiving sensor.

A spectral transmittance of the color filter 1090 is not selected such that the spectral transmittance of the color filter 1090 approximates to the x component xbar'(lambda) of the modified color matching function, and is selected such that the whole spectral responsivity approximates to the x component xbar'(lambda) of the modified color matching function. That is, the spectral transmittance of the color filter 1090 is selected such that a spectral responsivity indicating a relation between spectral intensity of the light to be measured 1050 incident on the color luminance meter 1000 and intensity of the signal S(X'c) output by the colorimetric optical system 1070 approximates to the x component xbar'(lambda) of the modified color matching function. Similarly, the spectral transmittance of the color filter 1091 is selected such that a spectral responsivity indicating a relation between spectral intensity of the light to be measured 1050 incident on the color luminance meter 1000 and intensity of the signal S(Y'c) output by the colorimetric optical system 1071 approximates to the y component ybar'(lambda) of the modified color matching function. The spectral transmittance of the color filter 1092 is selected such that a spectral responsivity indicating a relation between spectral intensity of the light to be measured 1050 incident on the color luminance meter 1000 and intensity of the signal S(Z'c) output by the colorimetric optical system 1072 approximates to the z component zbar' (lambda) of the modified color matching function.

Each of the color filters 1090, 1091, and 1092 may be a stacked body of a plurality of absorption filters, an interference filter, or a combination of an absorption filter and an interference filter. A material of an interference film included in the interference filter is a dielectric, for example, an oxide.

1.11 Signal Processing Circuit

As illustrated in FIG. 7, the signal processing circuit 1043 includes amplifier circuits 1110, 1111 and 1112, analog/digital converters 1120, 1121 and 1122, etc. The amplifier circuits 1110, 1111 and 1112 may be omitted in some cases depending on specifications of the light receiving sensors 1100, 1101, and 1102 and the analog/digital converters 1120, 1121 and 1122.

When the signals S(X'c), S(Y'c), and S(Z'c) are input to the signal processing circuit 1043, the amplifier circuits 1110, 1111 and 1112 amplify the signals S(X'c), S(Y'c), and S(Z'c), respectively, and the analog/digital converters 1120, 1121 and 1122 convert the amplified signals S(X'c), S(Y'c), and S(Z'c) into signal values X'c, Y'c, and Z'c, respectively.

1.12 Measuring Instrument Body

As illustrated in FIG. 7, the measuring instrument body 1011 includes a built-in computer 1130, a storage unit 1131, an operation unit 1132, and a display unit 1133. The built-in computer 1130 executes functions below by executing installed firmware. Hardware without software may perform some or all of the functions below. The storage unit 1131 corresponds to a flash memory, a hard disk drive, etc. The operation unit 1132 corresponds to a keyboard, a pointing device, a touch panel, a switch, a dial, etc. The display unit 1133 corresponds to a display, a lamp, a printer, etc.

When the built-in computer 1130 detects that an operation has been performed on the operation unit 1132, the built-in computer 1130 performs processing corresponding to the detected operation.

When the signal values X'c, Y'c, and Z'c are received, the built-in computer 1130 calculates the chromaticities x' and y' and the luminance Lv from the signal values X'c, Y'c, and Z'c using a correction factor read from the storage unit 1131, and displays the chromaticities x' and y' and the luminance Lv on the display unit 1133.

1.13 Arithmetic Algorithm

Figure 9:
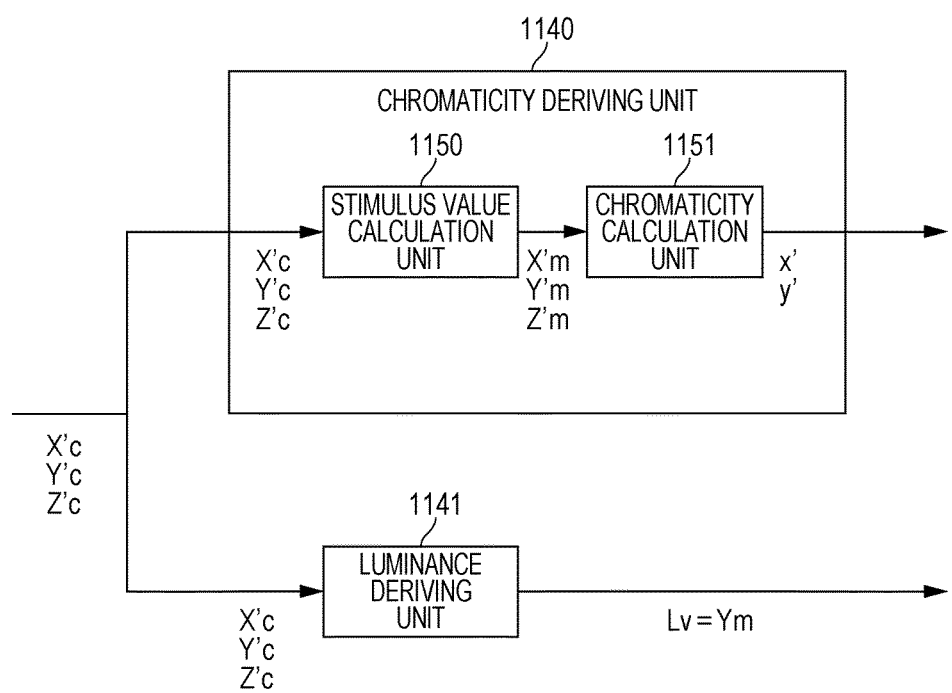
FIG. 9 is a block diagram illustrating an arithmetic algorithm.

A block diagram of FIG. 9 illustrates an arithmetic algorithm.

A chromaticity deriving unit 1140, a luminance deriving unit 1141, a stimulus value calculation unit 1150, and a chromaticity calculation unit 1151 illustrated in FIG. 9 indicate processing performed by the built-in computer 1130. The stimulus value calculation unit 1150 and the chromaticity calculation unit 1151 belong to the chromaticity deriving unit 1140.

1.14 Chromaticity Deriving Unit

The chromaticity deriving unit 1140 derives the chromaticities x' and y' from the signal values X'c, Y'c, and Z'c.

The stimulus value calculation unit 1150 calculates stimulus values X'm, Y'm, and Z'm corresponding to the case in which the modified color matching function is selected as the evaluation function for colorimetry from the signal values X'c, Y'c, and Z'c. When the stimulus values X'm, Y'm, and Z'm are calculated, the signal values X'c, Y'c, and Z'c are corrected as in Formulas (9), (10), and (11) below.

[Formula 6]

$$X'm = m11 \cdot X'c + m12 \cdot Y'c + m13 \cdot Z'c \quad (9)$$

$$Y'm = m21 \cdot X'c + m22 \cdot Y'c + m23 \cdot Z'c \quad (10)$$

$$Z'm = m31 \cdot X'c + m32 \cdot Y'c + m33 \cdot Z'c \quad (11)$$

The stimulus value X'm is obtained by calculating a weighted sum of the signal values X'c, Y'c, and Z'c using correction factors m11, m12, and m13 corresponding to weight coefficients. The correction factors m11, m12, and m13 are multiplied by the signal values X'c, Y'c, and Z'c, respectively. The correction factors m11, m12, and m13 are selected such that a spectral responsivity indicating a relation between spectral intensity of the light to be measured 1050 and the stimulus value X'm approximates to the x component xbar'(lambda) of the modified color matching function.

The stimulus value Y'm is obtained by calculating a weighted sum of the signal values X'c, Y'c, and Z'c using correction factors m21, m22, and m23 corresponding to weight coefficients. The correction factors m21, m22, and m23 are multiplied by the signal values X'c, Y'c, and Z'c, respectively. The correction factors m21, m22, and m23 are selected such that a spectral responsivity indicating a relation between spectral intensity of the light to be measured 1050 and the stimulus value Y'm approximates to the y component ybar'(lambda) of the modified color matching function.

The stimulus value Z'm is obtained by calculating a weighted sum of the signal values X'c, Y'c, and Z'c using correction factors m31, m32, and m33 corresponding to weight coefficients. The correction factors m31, m32, and m33 are multiplied by the signal values X'c, Y'c, and Z'c, respectively. The correction factors m31, m32, and m33 are selected such that a spectral responsivity indicating a relation between spectral intensity of the light to be measured 1050 and the stimulus value Z'm approximates to the z component zbar'(lambda) of the modified color matching function.

Generally speaking, a spectral responsivity of the colorimetric optical system is approximated to the color matching function selected as the evaluation function for colorimetry. However, the spectral responsivity is not fully consistent with the color matching function selected as the evaluation function for colorimetry. This point will be described using the case in which the CIE 1931 XYZ color matching function is selected as the evaluation function for colorimetry as an example.

Figure 10:
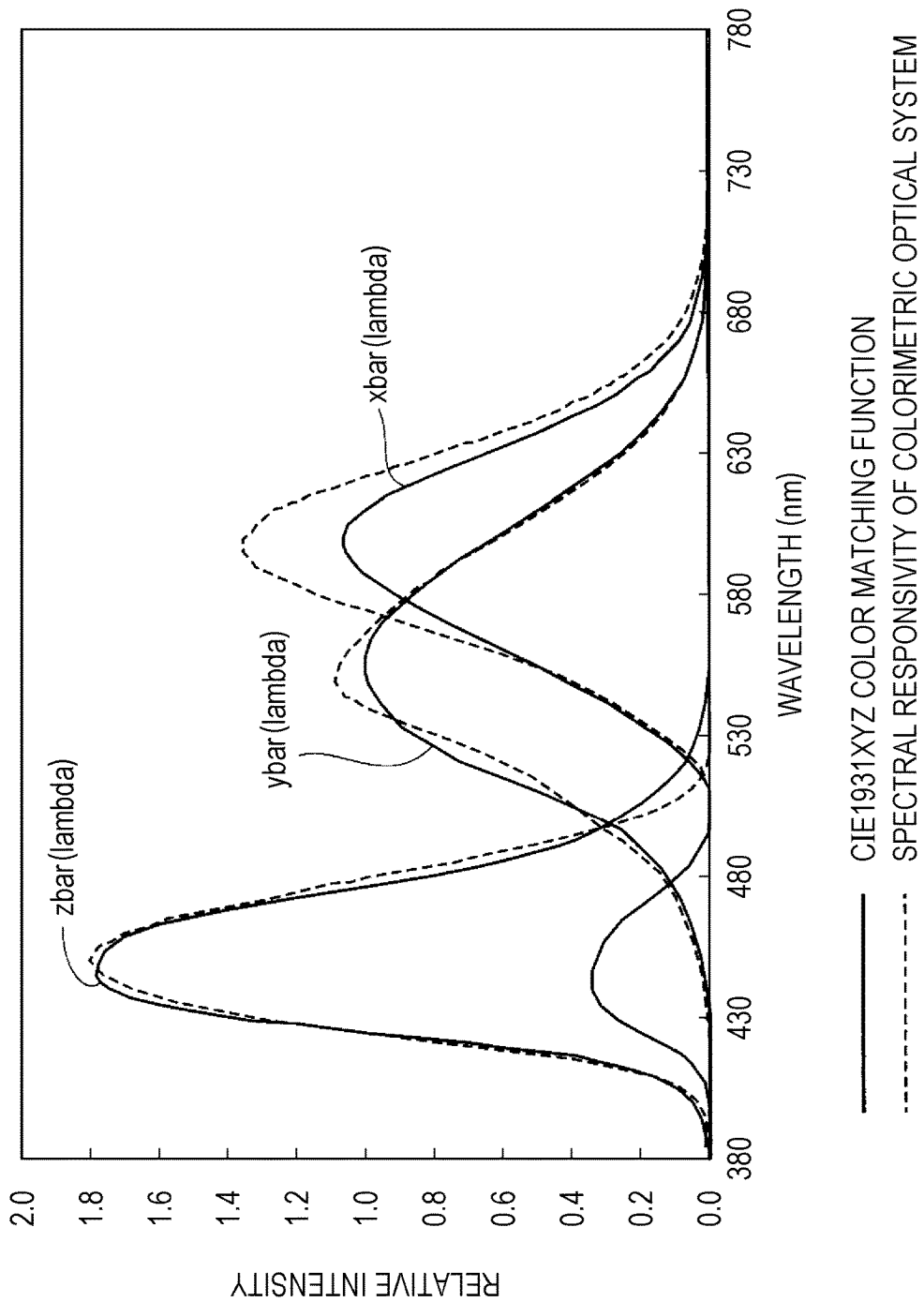
FIG. 10 is a graph illustrating the CIE 1931 XYZ color matching function and a spectral responsivity of a colorimetric optical system.

A graph of FIG. 10 illustrates the CIE 1931 XYZ color matching function and the spectral responsivity of the colorimetric optical system.

As illustrated in FIG. 10, a spectral responsivity of the colorimetric optical system for x component, a spectral responsivity of the colorimetric optical system for y component, and a spectral responsivity of the colorimetric optical system for z component approximate to the x component xbar(lambda), the y component ybar(lambda), and the z component zbar(lambda) of the CIE 1931 XYZ color matching function, respectively, but are not fully consistent with the x component xbar(lambda), the y component ybar (lambda), and the z component zbar(lambda) of the CIE 1931 XYZ color matching function. In addition, a relative relation among the spectral responsivity of the colorimetric optical system for x component, the spectral responsivity of the colorimetric optical system for y component, and the spectral responsivity of the colorimetric optical system for z component is inconsistent with a relative relation among the x component xbar(lambda) of the CIE 1931 XYZ color matching function, the y component ybar(lambda) of the CIE 1931 XYZ color matching function, and the z component zbar(lambda) of the CIE 1931 XYZ color matching function. This description is similarly applied when the modified color matching function is selected as the evaluation function for colorimetry.

For this reason, in the color luminance meter 1000, a spectral responsivity indicating a relation between the spectral intensity of the light to be measured 1050 and the signal values X'c, Y'c, and Z'c approximates to the x component xbar'(lambda), the y component ybar'(lambda), and the z component zbar'(lambda) of the modified color matching function, but is not fully consistent with the x component xbar'(lambda), the y component ybar'(lambda), and the z component zbar'(lambda) of the modified color matching function. In addition, a relative relation among a spectral responsivity indicating a relation between the spectral intensity of the light to be measured 1050 and the signal value X'c, a spectral responsivity indicating a relation between the spectral intensity of the light to be measured 1050 and the signal value Y'c, and a spectral responsivity indicating a relation between the spectral intensity of the light to be measured 1050 and the signal value Z'c is inconsistent with a relative relation among the x component xbar'(lambda) of the modified color matching function, the y component ybar'(lambda) of the modified color matching function, and the z component zbar'(lambda) of the modified color matching function. The correction factors m11, m12, m13, m21, m22, m23, m31, m32, and m33 are determined to mitigate these inconsistencies.

The chromaticity calculation unit 1151 calculates the chromaticities x' and y' from the stimulus values X'm, Y'm, and Z'm as in the following Formulas (12) and (13).

[Formula 7]

$$x' = \frac{X'm}{X'm + Y'm + Z'm} \quad (12)$$

$$y' = \frac{Y'm}{X'm + Y'm + Z'm} \quad (13)$$

1.15 Luminance Deriving Unit

The luminance deriving unit 1141 derives the luminance Lv from the signal values X'c, Y'c, and Z'c. When the luminance Lv is derived, a stimulus value Ym is obtained by correcting the signal values X'c, Y'c, and Z'c as in Formula (14) below, and the stimulus value Ym is set to the luminance Lv as in Formula (15) below.

[Formula 8]

$$Ym = L21 \cdot X'c + L22 \cdot Y'c + L23 \cdot Z'c \quad (14)$$

$$Lv = Ym \quad (15)$$

The stimulus value Ym is obtained by calculating a weighted sum of the signal values X'c, Y'c, and Z'c using correction factors L21, L22, and L23 corresponding to weight coefficients. The correction factors L21, L22, and L23 are multiplied by the signal values X'c, Y'c, and Z'c, respectively. The correction factors L21, L22, and L23 are selected such that a spectral responsivity indicating a relation between the spectral intensity of the light to be measured 1050 and the stimulus value Ym approximates to the y component ybar(lambda) of the CIE 1931 XYZ color matching function, that is, the standard spectral luminous efficiency V(lambda). The signal value Y'c is a y component of a stimulus value corresponding to the case in which the modified color matching function is selected as the evaluation function for colorimetry, and thus accurate luminance Lv may not be derived from the signal value Y'c. However, since the stimulus value Ym may be identified with a y component of a stimulus value corresponding to the case in which the CIE 1931 XYZ color matching function is selected as the evaluation function for colorimetry, accurate luminance Lv may be derived from the stimulus value Ym.

1.16 Correction Factor

The correction factors m11, m12, m13, m21, m22, m23, m31, m32 and m33 and the correction factors L21, L22 and L23 are determined by a calibration operation performed in advance.

In the calibration operation, a first light source, a second light source, and a third light source, real values of stimulus values of which are known, are prepared. In addition, colors of the first light source, the second light source, and the third light source are measured by the color luminance meter 1000. Further, the correction factors m11, m12, m13, m21, m22, m23, m31, m32 and m33 are determined as in Formula (16) below, and the correction factors L21, L22 and L23 are determined as in Formula (17) below.

[Formula 9]

$$\begin{pmatrix} m11 & m12 & m13 \\ m21 & m22 & m23 \\ m31 & m32 & m33 \end{pmatrix} = \begin{pmatrix} X'r & X'g & X'b \\ Y'r & Y'g & Y'b \\ Z'r & Z'g & Z'b \end{pmatrix} \begin{pmatrix} X'cr & X'cg & X'cb \\ Y'cr & Y'cg & Y'cb \\ Z'cr & Z'cg & Z'cb \end{pmatrix}^{-1} \quad (16)$$

$$(L21 \; L22 \; L23) = (Yr \; Yg \; Yb) \begin{pmatrix} X'cr & X'cg & X'cb \\ Y'cr & Y'cg & Y'cb \\ Z'cr & Z'cg & Z'cb \end{pmatrix}^{-1} \quad (17)$$

Stimulus values X'r, Y'r, and Z'r are real values of an x component, a y component, and a z component of the stimulus value of the first light source, respectively, corresponding to the case in which the modified color matching function is selected as the evaluation function for colorimetry. Stimulus values X'g, Y'g, and Z'g are real values of an x component, a y component, and a z component of the stimulus value of the second light source, respectively, corresponding to the case in which the modified color matching function is selected as the evaluation function for colorimetry. Stimulus values X'b, Y'b, and Z'b are real values of an x component, a y component, and a z component of the stimulus value of the third light source, respectively, corresponding to the case in which the modified color matching function is selected as the evaluation function for colorimetry.

A stimulus value Yr is a real value of a y component of a stimulus value of the first light source corresponding to the case in which the CIE 1931 XYZ color matching function is selected as the evaluation function for colorimetry. A stimulus value Yg is a real value of a y component of a stimulus value of the second light source corresponding to the case in which the CIE 1931 XYZ color matching function is selected as the evaluation function for colorimetry. A stimulus value Yb is a real value of a y component of a stimulus value of the third light source corresponding to the case in which the CIE 1931 XYZ color matching function is selected as the evaluation function for colorimetry.

Signal values X'cr, Y'cr, and Z'cr correspond to signal values X'c, Y'c, and Z'c, respectively, obtained when the first light source is measured by the color luminance meter 1000. Signal values X'cg, Y'cg, and Z'cg correspond to signal values X'c, Y'c, and Z'c, respectively, obtained when the second light source is measured by the color luminance meter 1000. Signal values X'cb, Y'cb, and Z'cb correspond to signal values X'c, Y'c, and Z'c, respectively, obtained when the third light source is measured by the color luminance meter 1000.

A color of each of the first light source, the second light source, and the third light source is selected such that the color may not be expressed by a mixture of colors of the two remaining light sources. Preferably, the colors of the first light source, the second light source, and the third light source correspond to red, green, and blue of the three primary colors, respectively. When the colors of the first light source, the second light source, and the third correspond to red, green, and blue of the three primary colors, respectively, and when a light source, which reproduces color by additive mixture of the three primary colors, such as the liquid crystal display is measured, the chromaticities x' and y' and the luminance Lv may be accurately measured.

1.17 Deriving Mechanism (Deriving Unit)

The signal processing circuit 1043 and the built-in computer 1130 are included in a deriving mechanism 1160. The deriving mechanism 1160 derives the chromaticities x' and y' and the luminance Lv from the signals S(X'c), S(Y'c), and S(Z'c) as a whole.

1.18 Flow of Measurement

Figure 11:
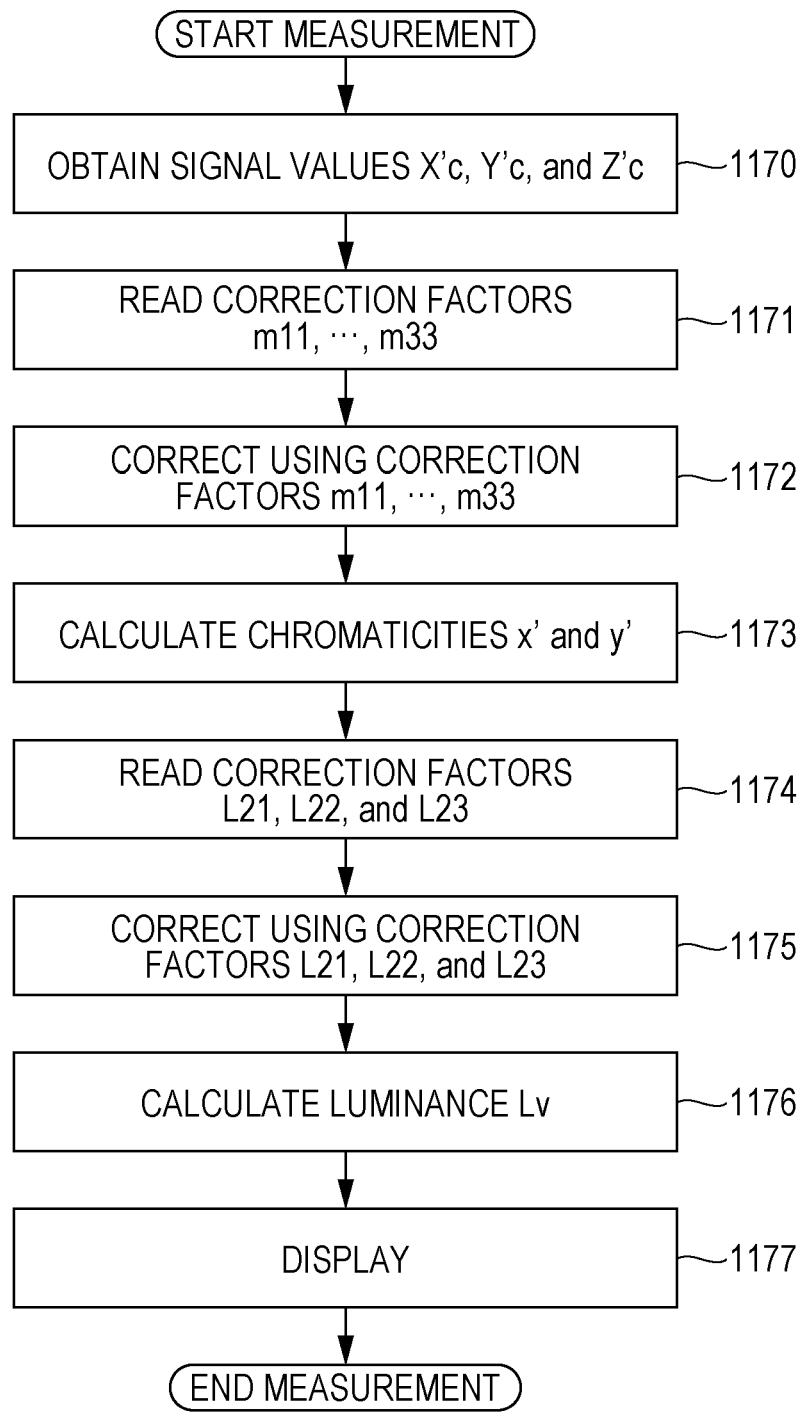
FIG. 11 is a flowchart illustrating a flow of measurement.

A flowchart of FIG. 11 illustrates a flow of measurement.

When it is detected that an operation for instructing that measurement be started is performed on the measuring instrument body 1011, measurement is started in the color luminance meter 1000. A trigger of a start of measurement may be changed.

When measurement is started, the chromaticities x' and y' and the luminance Lv are calculated after the signal values X'c, Y'c, and Z'c are obtained in Step 1170. An order of calculation of the chromaticities x' and y' and the luminance Lv is not restricted. However, in description below, it is presumed that the chromaticities x' and y' are calculated in Steps 1171 to 1173, and then the luminance Lv is calculated in Steps 1174 to 1176.

When the chromaticities x' and y' are calculated, the correction factors m11, m12, m13, m21, m22, m23, m31, m32, and m33 are read from the storage unit 1131 in Step 1171, the stimulus values X'm, Y'm, and Z'm are obtained by correcting the signal values X'c, Y'c, and Z c using the correction factors m11, m12, m13, m21, m22, m23, m31, m32, and m33 in Step 1172, and the chromaticities x' and y' are calculated from the stimulus values X'm, Y'm, and Z'm in Step 1173.

When the luminance Lv is calculated, the correction factors L21, L22, and L23 are read from the storage unit 1131 in Step 1174, the stimulus value Ym is obtained by correcting the signal values X'c, Y'c, and Z c using the correction factors L21, L22, and L23 in Step 1175, and the stimulus value Ym is set to the luminance Lv in Step 1176.

After the chromaticities x' and y' and the luminance Lv are derived, the chromaticities x' and y' and the luminance Lv are displayed on the display unit 1133 in Step 1177.

1.19 Advantage of Direct Stimulus Value Reading Scheme Over Spectrophotometric Colorimetry A colorimetric scheme is broadly divided into spectrophotometric colorimetry and the direct stimulus value reading scheme.

When colorimetry and photometry are performed using the spectrophotometric colorimetry, light to be measured is separated by a spectroscopic element such as a diffraction grating, intensity of each wavelength component is detected by a light receiving sensor array including a plurality of light receiving sensors, and a colorimetric value and a photometric value are calculated from a spectroscopic spectrum. According to the spectrophotometric colorimetry, even when spectral luminous efficiency is inconsistent with a part of the color matching function, both a colorimetric value corresponding to the color matching function and a photometric value corresponding to the spectral luminous efficiency may be accurately calculated from the spectroscopic spectrum. However, in the spectrophotometric colorimetry, a complex optical system such as the spectroscopic element, a bright lens system having high resolving power, etc. is necessary, and a large number of light receiving sensors are necessary, and the colorimetric photometer is large and high in cost.

On the other hand, when colorimetry and photometry are performed using a general direct stimulus value reading scheme, a stimulus value is detected using a light receiving sensor group including three light receiving sensors and a colorimetric optical system having spectral responsivity approximate to the color matching function, and a colorimetric value and a photometric value are calculated from the stimulus value. According to the direct stimulus value reading scheme, a complex optical system is unnecessary, a large number of light receiving sensors are unnecessary, and the colorimetric photometer is small and low in cost. However, in the general direct stimulus value reading scheme, even though a colorimetric value corresponding to the color matching function may be accurately calculated from the stimulus value when spectral luminous efficiency is inconsistent with apart of the color matching function, a photometric value corresponding to the spectral luminous efficiency may not be accurately calculated from the stimulus value.

On the other hand, in a direct stimulus value reading scheme adopted by the first embodiment, both a colorimetric value corresponding to the color matching function and a photometric value corresponding to spectral luminous efficiency may be accurately calculated even when spectral luminous efficiency is inconsistent with a part of the color matching function.

1.20 Calculation of Chromaticity and Luminance in First Embodiment

Figure 12:
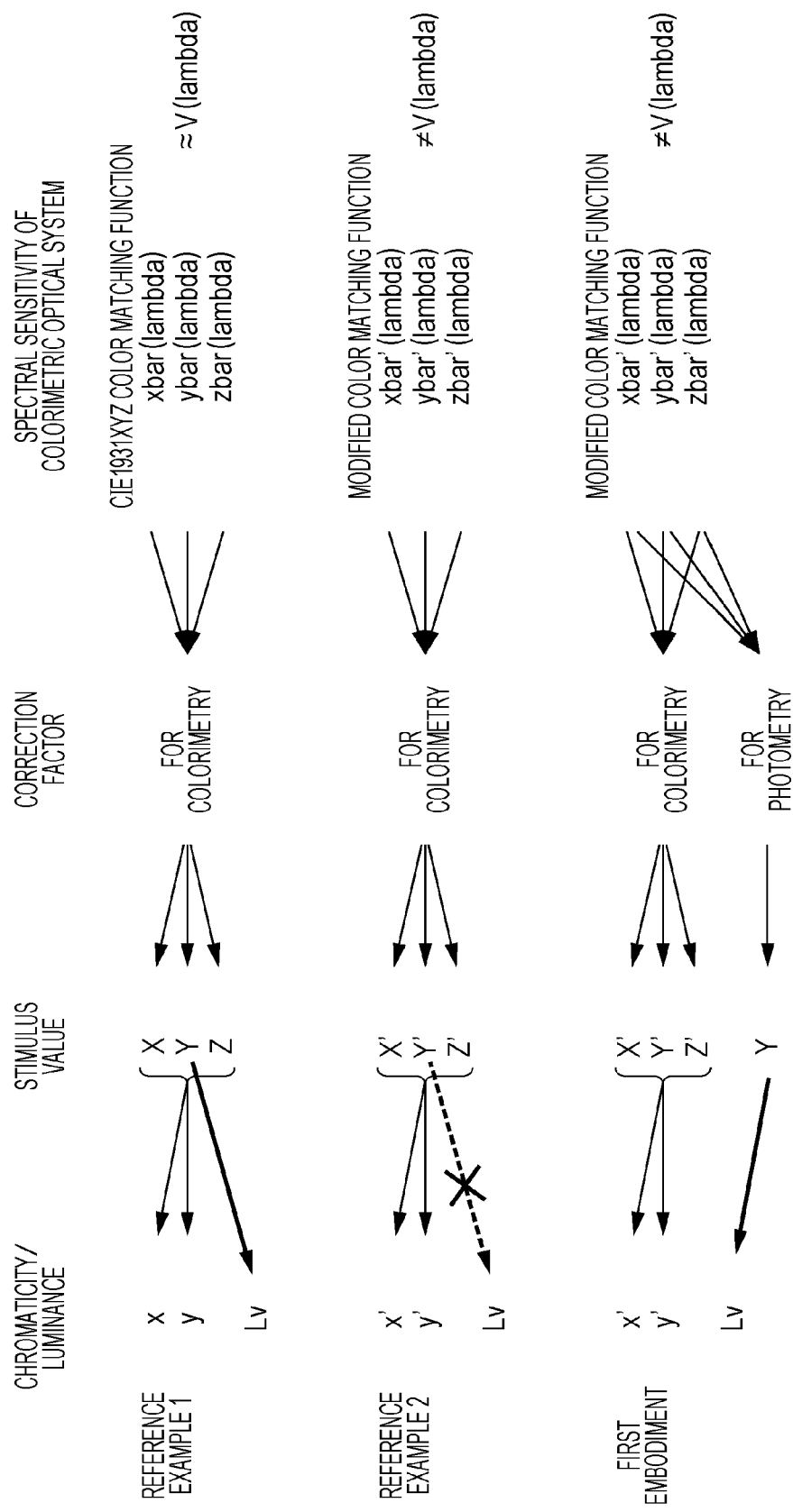
FIG. 12 is a schematic view illustrating an outline of calculation of chromaticity and luminance.

A schematic view of FIG. 12 illustrates an outline of calculation of chromaticity and luminance.

As illustrated in FIG. 12, in Reference Example 1, three colorimetric optical systems having spectral responsivities approximate to xbar(lambda), ybar(lambda), and zbar (lambda) of the CIE 1931 XYZ color matching function are provided.

In Reference Example 1, three signal values derived from the three colorimetric optical systems are corrected using correction factors for colorimetry, and stimulus values X, Y, and Z corresponding to the case in which the CIE 1931 XYZ color matching function is selected as the evaluation function for colorimetry are derived.

In Reference Example 1, chromaticities x and y are derived from the stimulus values X, Y, and Z, and the luminance Lv is derived from the stimulus value Y.

According to Reference Example 1, since the chromaticities x and y are derived based on the CIE 1931 XYZ color matching function, chromaticities x and y corresponding to the case in which CIE 1931 XYZ color matching function is selected as the evaluation function for colorimetry may be accurately derived. In addition, according to Reference Example 1, since the luminance Lv is derived based on the y component ybar(lambda) of the CIE 1931 XYZ color matching function consistent with the standard spectral luminous efficiency V(lambda), luminance Lv corresponding to a case in which the standard spectral luminous efficiency V(lambda) is selected as the evaluation function for photometry may be accurately derived.

In Reference Example 2, three colorimetric optical systems having spectral responsivities approximate to the x component xbar'(lambda), the y component ybar'(lambda), and the z component zbar'(lambda) of the modified color matching function, respectively, are provided.

In Reference Example 2, three signal values derived from the three colorimetric optical systems are corrected using correction factors for colorimetry, and stimulus values X', Y', and Z' are derived.

In Reference Example 2, the chromaticities x' and y' are derived from the stimulus values X', Y', and Z', and the luminance Lv is derived from the stimulus value Y'.

According to Reference Example 2, since the chromaticities x' and y' are derived based on the modified color matching function, chromaticities x' and y' corresponding to the case in which the modified color matching function is selected as the evaluation function for colorimetry may be accurately derived. However, since the luminance Lv is derived based on the y component ybar'(lambda) of the modified color matching function inconsistent with the standard spectral luminous efficiency V(lambda), luminance Lv corresponding to the case in which the standard spectral luminous efficiency V(lambda) is selected as the evaluation function for photometry may not be accurately derived.

On the other hand, in the first embodiment, three colorimetric optical systems having spectral responsivities approximate to the x component xbar'(lambda), the y component ybar'(lambda), and the z component zbar'(lambda) of the modified color matching function, respectively, are provided.

In the first embodiment, three signal values derived from the three colorimetric optical systems are corrected using correction factors for colorimetry, and stimulus values X', Y', and Z' are derived. Further, the three signal values derived from the three colorimetric optical systems are corrected using correction factors for photometry, and a stimulus value Y is derived.

In the first embodiment, the chromaticities x' and y' are derived from the stimulus values X', Y', and Z', and the luminance Lv is derived from the stimulus value Y.

According to the first embodiment, since the chromaticities x' and y' are derived based on the modified color matching function, chromaticities x' and y' corresponding to the case in which the modified color matching function is selected as the evaluation function for colorimetry may be accurately derived. In addition, since correction for photometry, which may be identified with driving the luminance Lv based on the y component ybar'(lambda) of the modified color matching function consistent with the standard spectral luminous efficiency V(lambda), is performed, the luminance Lv corresponding to the case in which the standard spectral luminous efficiency V(lambda) is selected as the evaluation function for photometry may be accurately derived.

1.21 Particularly Suitable Application

A device using a white light emitting diode (LED) as a light source has been widely used. For example, lighting equipment, a liquid crystal display, etc. using the white LED as a light source has been widely used. In a widely adopted white LED, a yellow phosphor is excited by blue excitation light emitted by a blue LED, and the yellow phosphor is allowed to emit yellow fluorescence, thereby obtaining white light including a blue excitation light component and a yellow fluorescent component.

In color evaluation of light emitted by the white LED, accuracy of measurement in a wavelength range from 400 nm to 500 nm, to which the excitation light component belongs, is important.

Figure 13:
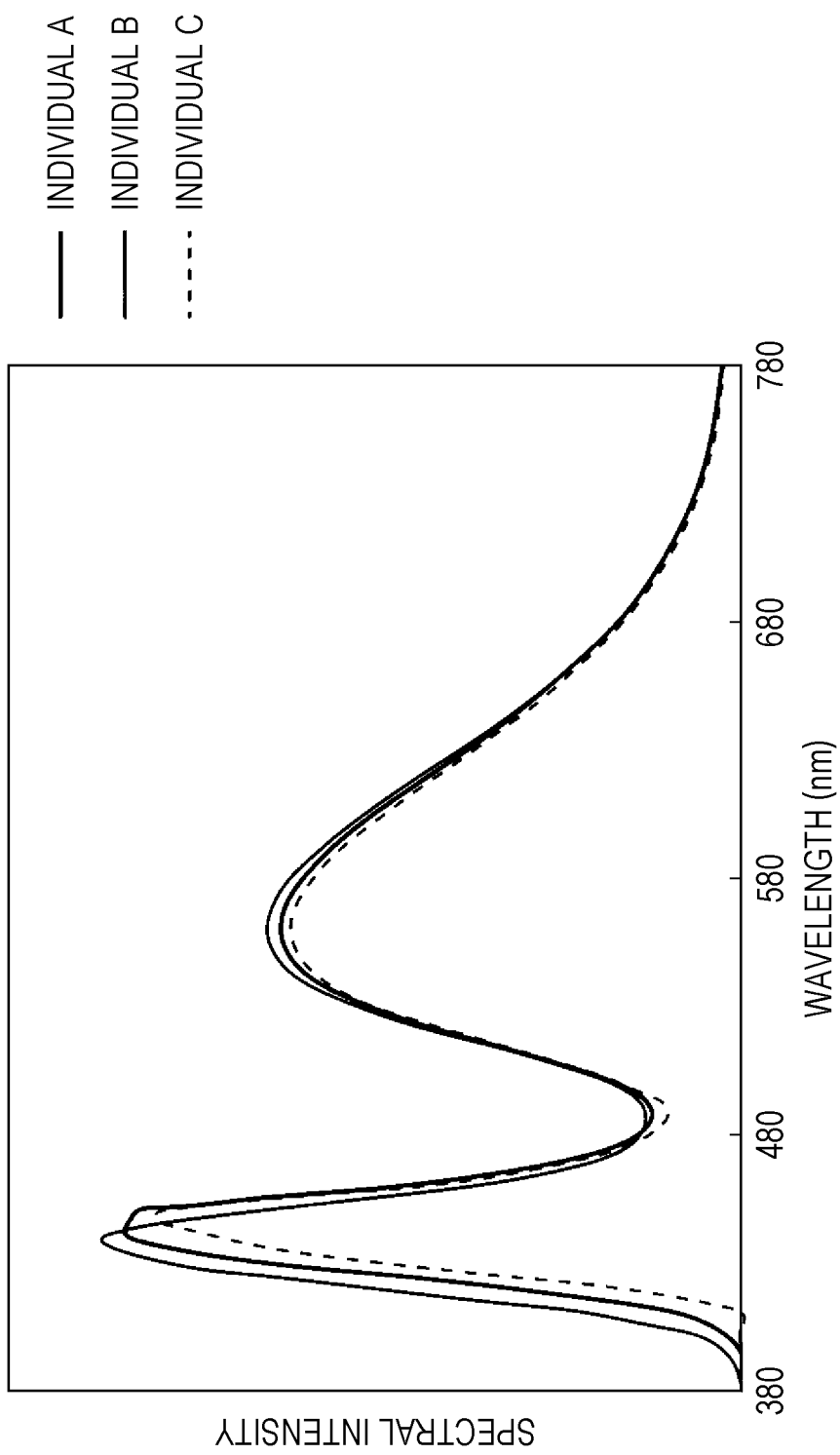
FIG. 13 is a graph illustrating spectral intensity of light emitted by a white LED for each individual.

FIG. 13 is a graph illustrating spectral intensity of light emitted by the white LED for each individual.

In general, as illustrated in FIG. 13, while spectral intensity of the fluorescent component is relatively stable, spectral intensity of the excitation light component is relatively unstable. The spectral intensity of the excitation light component has an individual difference of about 10 nm for a peak wavelength and an individual difference of about 10% for peak intensity. In addition, the peak wavelength of the spectral intensity of the excitation light component fluctuates by about 2 nm due to temperature even for the same individual.

In addition, while a peak of the spectral intensity of the fluorescent component is comparatively gentle, a peak of the spectral intensity of the excitation light component is relatively steep.

From these results, in color evaluation of light emitted by the white LED, an influence of accuracy of measurement in the wavelength range from 400 nm to 500 nm, to which the excitation light component belongs, on a colorimetric value, in particular, on a Z component of a stimulus value is large.

For this reason, in color evaluation of light emitted by the white LED, selection of a z component of the color matching function is important, and there is a strong desire to obtain a colorimetric value corresponding to the modified color matching function having the z component consistent with the human visual sense.

Meanwhile, there is a strong desire to obtain a photometric value corresponding to standard spectral luminous efficiency consistent with the y component of the CIE 1931 XYZ color matching function for a case of performing comparison with a past measurement result.

The color luminance meter 1000 capable of measuring both the colorimetric value corresponding to the modified color matching function and a photometric value corresponding to the standard spectral luminous efficiency consistent with the y component of the CIE 1931 XYZ color matching function may respond to these desires and is particularly suitable for color evaluation of light emitted by the white LED.

Modified Example

Figure 14:
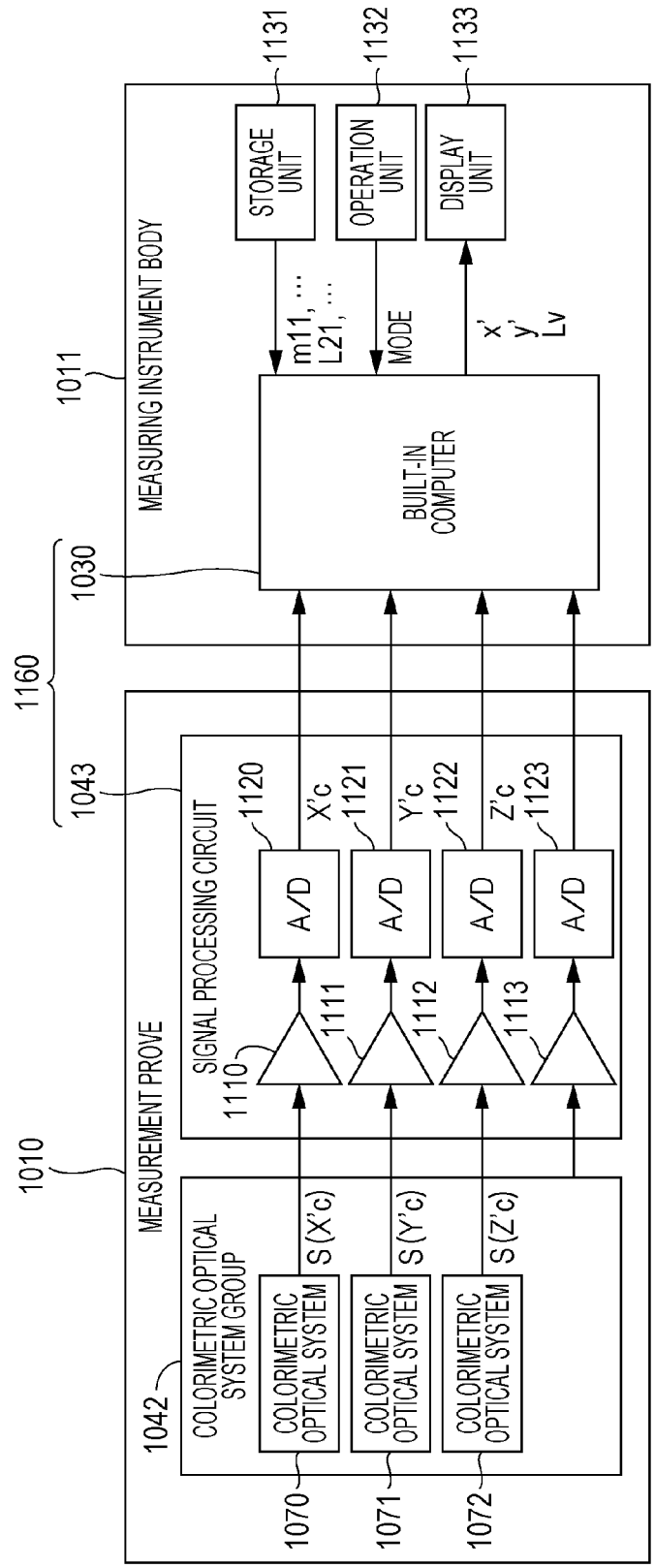
FIG. 14 is a schematic view illustrating a modified example of the color luminance meter.

As illustrated in FIG. 14, the signal processing circuit 1043 may further include an amplifier circuit 1113 and an analog/digital converter 1123 as a reference circuit for measuring a dark current in the colorimetric optical system group 1042.

A signal indicating intensity of the dark current output from the colorimetric optical system group is amplified by the amplifier circuit 1113, converted into a signal value by the analog/digital converter 1123, and sent to the built-in computer. Zero adjustment is performed in the measuring instrument body according to the signal value.

When such a configuration is adopted, zero adjustment may be performed by measuring a dark current in real time at the time of measurement.

2 Second Embodiment

2.1 Difference Between First Embodiment and Second Embodiment

A second embodiment relates to a colorimetric photometer.

Figure 15:
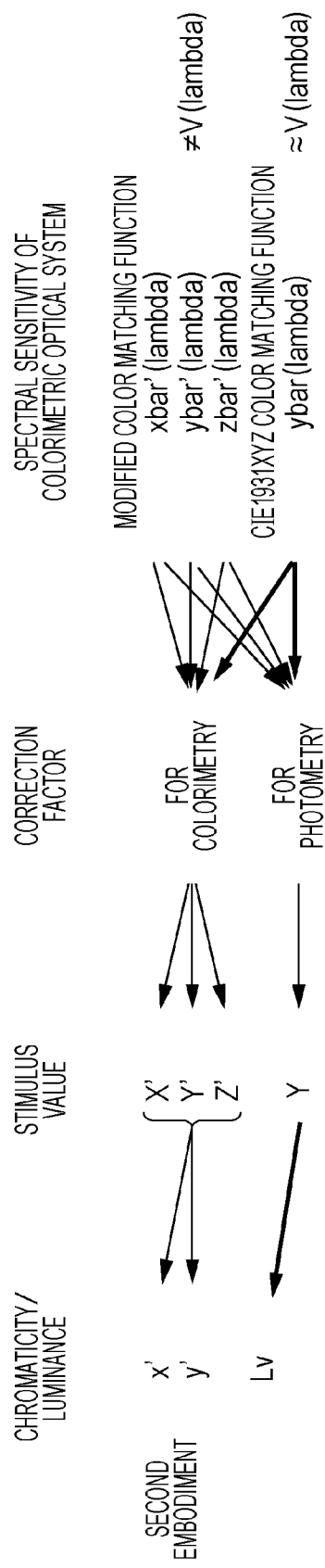
FIG. 15 is a schematic view illustrating an outline of calculation of chromaticity and luminance.

A schematic view of FIG. 15 illustrates an outline of calculation of chromaticities x' and y' and luminance Lv.

As illustrated in FIG. 15, in the second embodiment, similarly to the first embodiment, three colorimetric optical systems having spectral responsivities approximate to an x component xbar'(lambda), a y component ybar'(lambda), and a z component zbar'(lambda) of a modified color matching function, respectively, are provided. In addition, in the second embodiment, one colorimetric optical system having spectral responsivity approximate to a y component ybar (lambda) of a CIE 1931 XYZ color matching function is provided. Therefore, four colorimetric optical systems are provided in the second embodiment.

In the second embodiment, unlike the first embodiment, four signal values derived from the four colorimetric optical systems are corrected using correction factors for colorimetry, and stimulus values X', Y', and Z' are derived. In addition, in the second embodiment, the four signal values derived from the four colorimetric optical systems are corrected using correction factors for photometry, and a stimulus value Y is derived.

In the second embodiment, similarly to the first embodiment, the chromaticities x' and y' are derived from the stimulus values X', Y', and Z'. In addition, in the second embodiment, similarly to the first embodiment, the luminance Lv is derived from the stimulus value Y.

According to the second embodiment, since the chromaticities x' and y' are derived based on the modified color matching function, chromaticities x' and y' corresponding to a case in which the modified color matching function is selected as an evaluation function for colorimetry are accurately derived. In addition, according to the second embodiment, since the luminance Lv is derived based on the y component ybar(lambda) of the CIE 1931 XYZ color matching function consistent with a standard spectral luminous efficiency V(lambda), luminance Lv corresponding to a case in which the standard spectral luminous efficiency V(lambda) is selected as an evaluation function for photometry is accurately derived.

2.2 Measurement Probe

Figure 16:
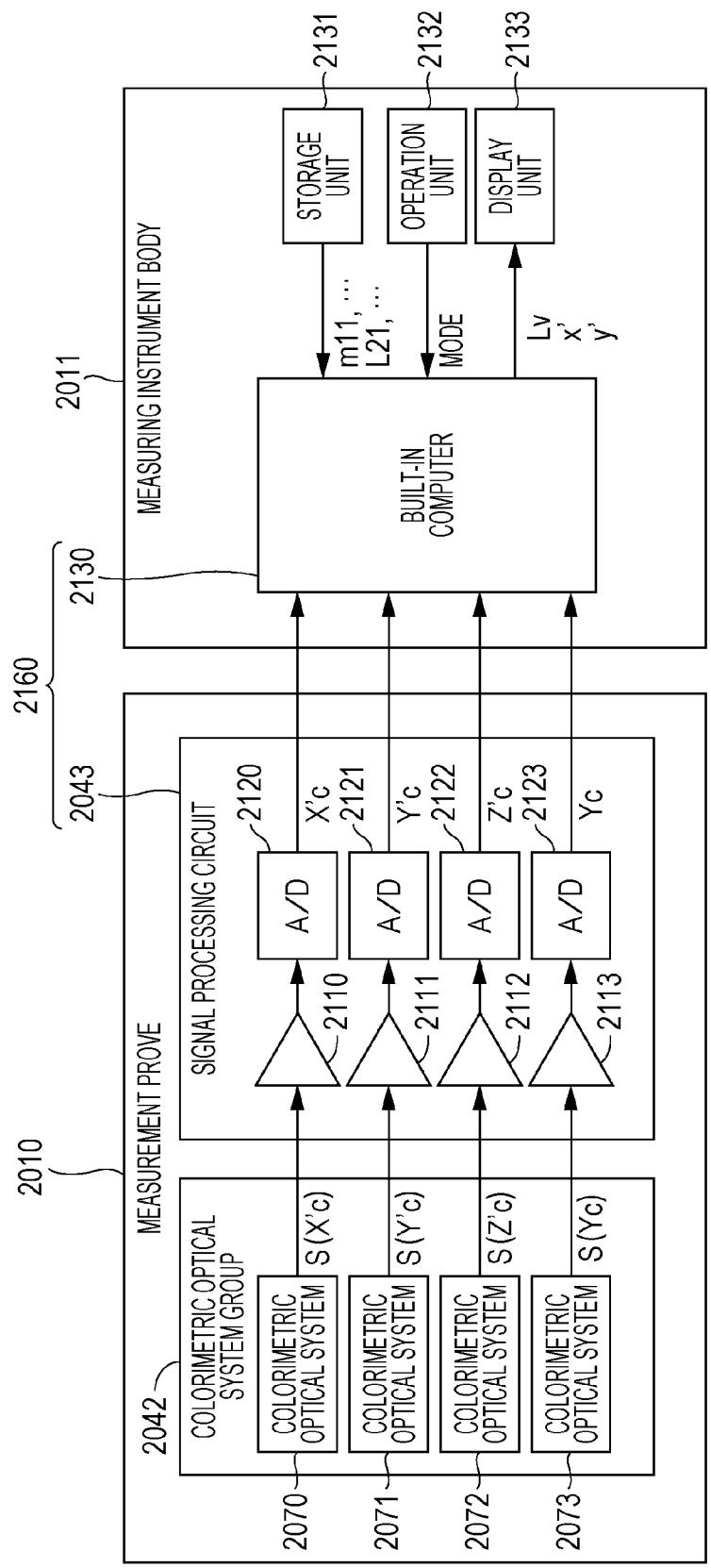
FIG. 16 is a block diagram of an electrical system of a measurement probe and a measuring instrument body.

A block diagram of FIG. 16 illustrates an electrical system of a measurement probe 2010 and a measuring instrument body 2011. The electrical system of the measurement probe 2010 and the measuring instrument body 2011 of the second embodiment replaces the electrical system of the measurement probe 1010 and the measuring instrument body 1011 of the first embodiment.

As illustrated in FIG. 16, the measurement probe 2010 includes a colorimetric optical system group 2042, a signal processing circuit 2043, etc.

The colorimetric optical system group 2042 outputs signals S(X'c), S(Y'c), S(Z'c), and S(Yc).

When the signals S(X'c), S(Y'c), S(Z'c), and S(Yc) are input, the signal processing circuit 2043 processes the signals S(X'c), S(Y'c), S(Z'c), and S(Yc), obtains signal values X'c, Y'c, Z'c, and Yc expressing intensities of the signals S(X'c), S(Y'c), S(Z'c), and S(Yc), respectively, and transmits the signal values X'c, Y'c, Z'c, and Yc to the measuring instrument body 2011.

2.3 Colorimetric Optical System Group

The colorimetric optical system group 2042 includes colorimetric optical systems 2070, 2071, 2072, and 2073. The colorimetric optical systems 2070, 2071, and 2072 of the second embodiment are the same as the colorimetric optical systems 1070, 1071, and 1072 of the first embodiment.

Similarly to the colorimetric optical systems 1070, 1071, and 1072 of the first embodiment, the colorimetric optical system 2073 includes a condenser lens group, a color filter, and a light receiving sensor. The light receiving sensor included in the colorimetric optical system 2073 outputs the signal S(Yc). The intensity of the signal S(Yc) depends on spectral intensity of light to be measured 1050. Spectral responsivity indicating a relation between the spectral intensity of the light to be measured 1050 and the intensity of the signal S(Yc) approximates to the y component ybar(lambda) of the CIE 1931 XYZ color matching function, that is, the standard spectral luminous efficiency V(lambda).

2.4 Signal Processing Circuit

As illustrated in FIG. 16, the signal processing circuit 2043 includes amplifier circuits 2110, 2111, 2112, and 2113, analog/digital converters 2120, 2121, 2122, and 2123, etc. The amplifier circuits 2110, 2111, and 2112 of the second embodiment are the same as the amplifier circuits 1110, 1111, and 1112 of the first embodiment, respectively. The analog/digital converters 2120, 2121, and 2122 of the second embodiment are the same as the analog/digital converters 1120, 1121, and 1122 of the first embodiment, respectively.

When the signal S(Yc) is input to the signal processing circuit 2043, the amplifier circuit 2113 amplifies the signal S(Yc), and the analog/digital converter 2123 converts the amplified signal S(Yc) into the signal value Yc.

2.5 Measuring Instrument Body

As illustrated in FIG. 16, the measuring instrument body 2011 includes a built-in computer 2130, a storage unit 2131, an operation unit 2132, and a display unit 2133.

When the signal values X'c, Y'c, and Z'c are received, the built-in computer 2130 calculates the chromaticities x' and y' and the luminance Lv from the signal values X'c, Y'c, Z'c, and Yc using correction factors read from the storage unit 2131, and causes the display unit 2133 to display the chromaticities x' and y' and the luminance Lv.

2.6 Arithmetic Algorithm

Figure 17:
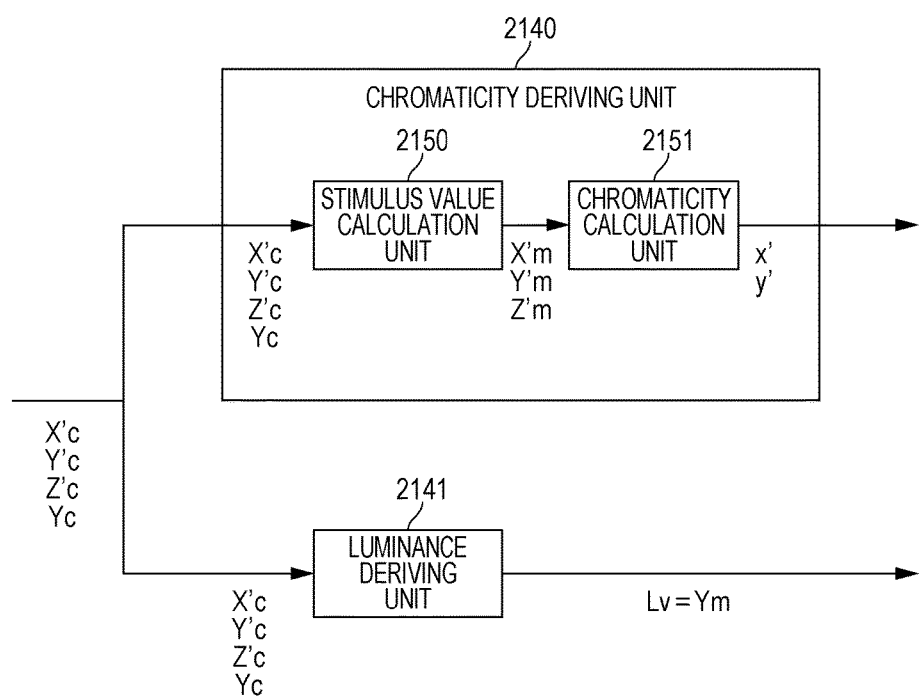
FIG. 17 is a block diagram illustrating an arithmetic algorithm.

A block diagram illustrated in FIG. 17 illustrates an arithmetic algorithm.

A chromaticity deriving unit 2140, a luminance deriving unit 2141, a stimulus value calculation unit 2150, and a chromaticity calculation unit 2151 illustrated in FIG. 17 indicate processing performed by the built-in computer 2130. The stimulus value calculation unit 2150 and the chromaticity calculation unit 2151 belong to the chromaticity deriving unit 2140.

2.7 Chromaticity

The chromaticity deriving unit 2140 derives the chromaticities x' and y' from the signal values X'c, Y'c, Z'c and Yc.

The stimulus value calculation unit 2150 calculates stimulus values X'm, Y'm, and Z'm from the signal values X'c, Y'c, Z'c and Yc. When the stimulus values X'm, Y'm, and Z'm are calculated, the signal values X'c, Y'c, and Z'c are corrected as in the following Formulas (18), (19), and (20).

[Formula 10]

$$X'm = m11 \cdot X'c + m12 \cdot Y'c + m13 \cdot Z'c + m14 \cdot Yc \qquad (18)$$

$$Y'm = m21 \cdot X'c + m22 \cdot Y'c + m23 \cdot Z'c + m24 \cdot Yc \qquad (19)$$

$$Z'm = m31 \cdot X'c + m32 \cdot Y'c + m33 \cdot Z'c + m14 \cdot Yc \qquad (20)$$

The stimulus value X'm is obtained by calculating a weighted sum of the signal values X'c, Y'c, Z'c, and Yc using correction factors m11, m12, m13, and m14 corresponding to weight coefficients. The correction factors m11, m12, m13, and m14 are multiplied by the signal values X'c, Y'c, Z'c, and Yc respectively. The correction factors m11, m12, m13 and m14 are selected such that a spectral responsivity indicating a relation between spectral intensity of the light to be measured 1050 and the stimulus value X'm approximates to the x component xbar'(lambda) of the modified color matching function.

The stimulus value Y'm is obtained by calculating a weighted sum of the signal values X'c, Y'c, Z'c, and Yc using correction factors m21, m22, m23, and m24 corresponding to weight coefficients. The correction factors m21, m22, m23, and m24 are multiplied by the signal values X'c, Y'c, Z'c, and Yc respectively. The correction factors m21, m22, m23, and m24 are selected such that a spectral responsivity indicating a relation between spectral intensity of the light to be measured 1050 and the stimulus value Y'm approximates to the y component ybar'(lambda) of the modified color matching function.

The stimulus value Z'm is obtained by calculating a weighted sum of the signal values X'c, Y'c, Z'c, and Yc using correction factors m31, m32, m33, and m34 corresponding to weight coefficients. The correction factors m31, m32, m33, and m34 are multiplied by the signal values X'c, Y'c, Z'c, and Yc respectively. The correction factors m31, m32, m33, and m34 are selected such that a spectral responsivity indicating a relation between spectral intensity of the light to be measured 1050 and the stimulus value Z'm approximates to the z component zbar' (lambda) of the modified color matching function.

The chromaticity calculation unit 2151 calculates the chromaticities x' and y' from the stimulus values X'm, Y'm, and Z'm as in the following Formulas (21) and (22).

[Formula 11]

$$x' = \frac{X'm}{X'm + Y'm + Z'm} \qquad (21)$$

$$y' = \frac{Y'm}{X'm + Y'm + Z'm} \qquad (22)$$

2.8 Luminance

The luminance deriving unit 2141 derives the luminance Lv from the signal values X'c, Y'c, Z'c, and Yc. When the luminance Lv is derived, a stimulus value Ym is obtained by correcting the signal values X'c, Y'c, Z'c, and Yc as in Formula (23) below, and the stimulus value Ym is set to the luminance Lv as in the following Formula (24).

[Formula 12]

$$Ym = L21 \cdot X'c + L22 \cdot Y'c + L23 \cdot Z'c + L24 \cdot Yc \qquad (23)$$

$$Lv = Ym \qquad (24)$$

The stimulus value Ym is obtained by calculating a weight sum of the signal values X'c, Y'c, Z'c, and Yc using correction factors L21, L22, L23, and L24 corresponding to weight coefficients. The correction factors L21, L22, L23, and L24 are multiplied by the signal values X'c, Y'c, Z'c, and Yc, respectively. The correction factors L21, L22, L23, and L24 are selected such that the spectral responsivity indicating the relation between the spectral intensity of the light to be measured 1050 and the stimulus value Ym approximates to the y component ybar(lambda) of the CIE 1931 XYZ color matching function, that is, the standard spectral luminous efficiency V(lambda). The signal value Y'c is a y component of a stimulus value corresponding to the case in which the modified color matching function is selected as the evaluation function for colorimetry, and thus accurate luminance Lv may not be derived from the signal value Y'c. However, since the stimulus value Ym may be identified with a y component of a stimulus value corresponding to the case in which the CIE 1931 XYZ color matching function is selected as the evaluation function for colorimetry, accurate luminance Lv may be derived from the stimulus value Ym.

2.9 Deriving Mechanism (Deriving Unit)

The signal processing circuit 2043 and the built-in computer 2130 are included in a deriving mechanism 2160. The deriving mechanism 2160 derives the chromaticities x' and y' and the luminance Lv from the signals S(X'c), S(Y'c), S(Z'c), and S(Yc) as a whole.

2.10 Correction Factor

The correction factors m11, m12, m13, m14, m21, m22, m23, m24, m31, m32, m33, and m34, and the correction factors L21, L22, L23, and L24 are determined by a calibration operation performed in advance.

In the calibration operation, a first light source, a second light source, a third light source, and a fourth light source, real values of stimulus values of which are known, are prepared. In addition, colors of the first light source, the second light source, the third light source, and the fourth light source are measured by the color luminance meter 1000. Further, the correction factors m11, m12, m13, m14, m21, m22, m23, m24, m31, m32, m33, and m34, and the correction factors L21, L22, L23, and L24 are determined as in Formula (25) below.

[Formula 13]

$$\begin{pmatrix} m11 & m12 & m13 & m14 \\ m21 & m22 & m23 & m24 \\ m31 & m32 & m33 & m34 \\ L21 & L22 & L23 & L24 \end{pmatrix} = \qquad (25)$$

$$\begin{pmatrix} X'r & X'g & X'b & X'f \\ Y'r & Y'g & Y'b & Y'f \\ Z'r & Z'g & Z'b & Z'f \\ Yr & Yg & Yb & Yf \end{pmatrix} \begin{pmatrix} X'cr & X'cg & X'cb & X'cf \\ Y'cr & Y'cg & Y'cb & Y'cf \\ Z'cr & Z'cg & Z'cb & Z'cf \\ Ycr & Ycg & Ycb & Ycf \end{pmatrix}^{-1}$$

Stimulus values X'r, Y'r, and Z'r are real values of an x component, a y component, and a z component of the stimulus value of the first light source, respectively, corresponding to the case in which the modified color matching function is selected as the evaluation function for colorimetry. Stimulus values X'g, Y'g, and Z'g are real values of an x component, a y component, and a z component of the stimulus value of the second light source, respectively, corresponding to the case in which the modified color matching function is selected as the evaluation function for colorimetry. Stimulus values X'b, Y'b, and Z'b are real values of an x component, a y component, and a z component of the stimulus value of the third light source, respectively, corresponding to the case in which the modified color matching function is selected as the evaluation function for colorimetry. Stimulus values X'f, Y'f, and Z'f are real values of an x component, a y component, and a z component of the stimulus value of the fourth light source, respectively, corresponding to the case in which the modified color matching function is selected as the evaluation function for colorimetry.

A stimulus value Yr is a real value of a y component of a stimulus value of the first light source corresponding to the case in which the CIE 1931 XYZ color matching function is selected as the evaluation function for colorimetry. A stimulus value Yg is a real value of a y component of a stimulus value of the second light source corresponding to the case in which the CIE 1931 XYZ color matching function is selected as the evaluation function for colorimetry. A stimulus value Yb is a real value of a y component of a stimulus value of the third light source corresponding to the case in which the CIE 1931 XYZ color matching function is selected as the evaluation function for colorimetry. A stimulus value Yf is a real value of a y component of a stimulus value of the fourth light source corresponding to the case in which the CIE 1931 XYZ color matching function is selected as the evaluation function for colorimetry.

Signal values X'cr, Y'cr, Z'cr, and Ycr correspond to signal values X'c, Y'c, Z'c, and Yc, respectively, obtained when the first light source is measured by the color luminance meter. Signal values X'cg, Y'cg, Z'cg, and Ycg correspond to signal values X'c, Y'c, Z'c, and Yc, respectively, obtained when the second light source is measured by the color luminance meter. Signal values X'cb, Y'cb, Z'cb, and Ycb correspond to signal values X'c, Y'c, Z'c, and Yc, respectively, obtained when the third light source is measured by the color luminance meter. Signal values X'cf, Y'cf, Z'cf, and Ycf correspond to signal values X'c, Y'c, Z'c, and Yc, respectively, obtained when the fourth light source is measured by the color luminance meter.

A color of each of the first light source, the second light source, and the third light source is selected similarly to the case of the first embodiment. A color of the fourth light source is preferably selected to be greatly different from the colors of the first light source, the second light source, and the third light source.

3 Third Embodiment

3.1 Difference Between Second Embodiment and Third Embodiment

A third embodiment relates to an arithmetic algorithm replacing the arithmetic algorithm of the second embodiment.

Figure 18:
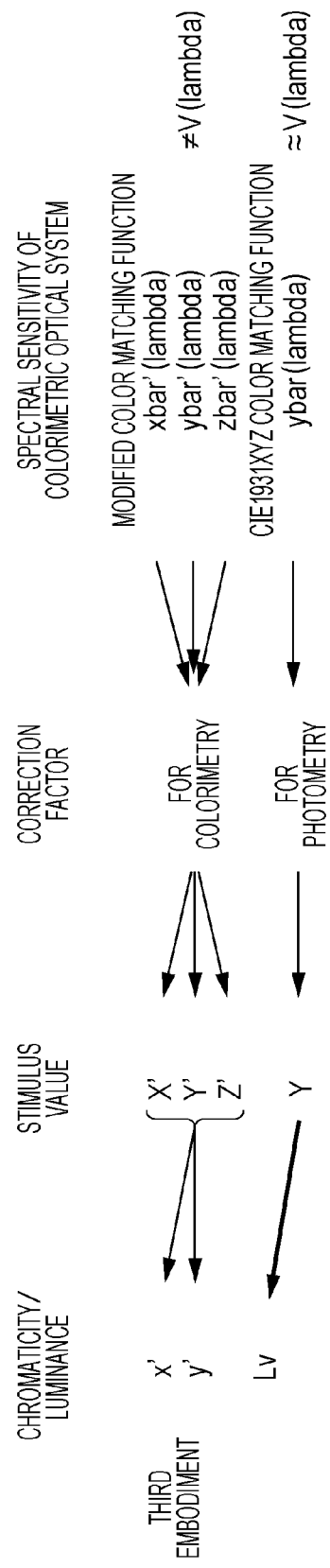
FIG. 18 is a schematic view illustrating an outline of calculation of chromaticity and luminance.

A schematic view of FIG. 18 illustrates an outline of calculation of chromaticities x' and y' and luminance Lv.

As illustrated in FIG. 18, in the third embodiment, similarly to the second embodiment, three colorimetric optical systems having spectral responsivities approximate to an x component xbar'(lambda), a y component ybar'(lambda), and a z component zbar'(lambda) of a modified color matching function, respectively, are provided. In addition, in the third embodiment, similarly to the second embodiment, one colorimetric optical system having spectral responsivity approximate to a y component ybar(lambda) of a CIE 1931 XYZ color matching function is provided.

In the third embodiment, unlike the second embodiment, three signal values derived from the former three colorimetric optical systems are correcting using correction factors for colorimetry, and stimulus values X', Y', and Z' are derived. In addition, in the third embodiment, unlike the second embodiment, one signal value derived from the latter one colorimetric optical system is corrected using a correction factor for photometry, and a stimulus value Y is derived.

In the third embodiment, similarly to the second embodiment, the chromaticities x' and y' are derived from the stimulus values X', Y', and Z'. In addition, in the third embodiment, similarly to the second embodiment, the luminance Lv is derived from the stimulus value Y.

According to the third embodiment, since the chromaticities x' and y' are derived based on the modified color matching function, chromaticities x' and y' corresponding to a case in which the modified color matching function is selected as an evaluation function for colorimetry may be accurately derived. In addition, according to the third embodiment, since the luminance Lv is derived based on the y component ybar(lambda) of the CIE 1931 XYZ color matching function consistent with a standard spectral luminous efficiency V(lambda), luminance Lv corresponding to a case in which the standard spectral luminous efficiency V(lambda) is selected as an evaluation function for photometry may be accurately derived.

3.2 Arithmetic Algorithm

Figure 19:
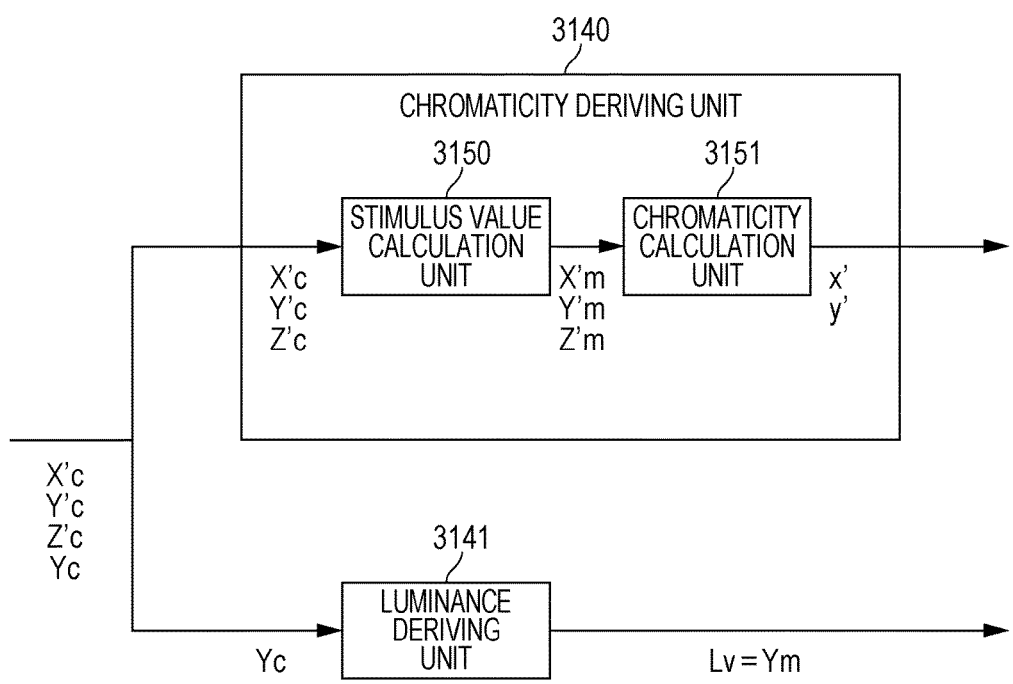
FIG. 19 is a block diagram illustrating an arithmetic algorithm.

A block diagram of FIG. 19 illustrates an arithmetic algorithm of the third embodiment.

As illustrated in FIG. 19, a chromaticity deriving unit 3140, a luminance deriving unit 3141, a stimulus value calculation unit 3150, and a chromaticity calculation unit 3151 indicate processing performed by the built-in computer 2130. The stimulus value calculation unit 3150 and the chromaticity calculation unit 3151 belong to the chromaticity deriving unit 3140.

Similarly to the chromaticity deriving unit 1140 of the first embodiment, the chromaticity deriving unit 3140 derives the chromaticities x' and y' from signal values X'c, Y'c, and Z'c. Similarly to the stimulus value calculation unit 1150 of the first embodiment, the stimulus value calculation unit 3150 calculates stimulus values X'm, Y'm, and Z'm from the signal values X'c, Y'c, and Z'c. Similarly to the chromaticity calculation unit 1151 of the first embodiment, the chromaticity calculation unit 3151 calculates the chromaticities x' and y' from the stimulus values X'm, Y'm, and Z'm.

The luminance deriving unit 3141 derives the luminance Lv from a signal value Yc. When the luminance Lv is derived, a stimulus value Ym is obtained by correcting the signal value Yc as in Formula (26) below, and the stimulus value Ym is set to the luminance Lv as in Formula (27) below.

[Formula 14]

$$Ym = L22 \cdot Yc \tag{26}$$

$$Lv = Ym \tag{27}$$

The stimulus value Ym is obtained by multiplying a correction factor L24 by the signal value Yc. It is allowed that the correction factor L24 is 1, that is, correction is not actually performed. The correction factor L24 is determined by a calibration operation performed in advance.

When the arithmetic algorithm of the second embodiment is replaced with the arithmetic algorithm of the third embodiment, the deriving mechanism 2160 derives the chromaticities x' and y' from signals S(X'c), S(Y'c), and S(Z'c), and derives the luminance Lv from a signal S(Yc).

A part of the arithmetic algorithm of the second embodiment and a part of the arithmetic algorithm of the third embodiment may be combined. For example, calculation of the chromaticities x' and y' of the second embodiment and calculation of the luminance Lv of the third embodiment may be combined. Calculation of the luminance Lv of the second embodiment and calculation of the chromaticities x' and y' of the third embodiment may be combined.

Although the invention has been shown and described in detail, the above description is illustrative and is not limited in all aspects. Therefore, it is understood that numerous modifications and variations may be devised without departing from the scope of the invention.

REFERENCE SIGNS LIST

1000 color luminance meter
1010 measurement probe
1011 measuring instrument body

The invention claimed is:

1. A direct stimulus value reading type colorimetric photometer comprising:
    a colorimetric optical system group including a first colorimetric optical system, a second colorimetric optical system, and a third colorimetric optical system, the first colorimetric optical system, the second colorimetric optical system, and the third colorimetric optical system having spectral responsivities approximate to a first part, a second part, and a third part of a color matching function, respectively, the first colorimetric optical system, the second colorimetric optical system, and the third colorimetric optical system outputting a first signal, a second signal, and a third signal having intensities depending on spectral intensity of light to be measured, respectively; and
    a deriving unit connected to said colorimetric optical system group that derives, from said first signal, said second signal, and said third signal, a colorimetric value corresponding to a case in which the color matching function is selected as an evaluation function for colorimetry and a photometric value corresponding to a case in which spectral luminous efficiency is selected as an evaluation function for photometry from at least the three signals when the spectral luminous efficiency is not consistent with any one of the first part, the second part, and the third part.

2. The direct stimulus value reading type colorimetric photometer according to claim 1, wherein
    a fourth signal is further output from the colorimetric optical system group, and
    the deriving unit derives the colorimetric value and the photometric value from the first signal, the second signal, the third signal, and the fourth signal.

3. The direct stimulus value reading type colorimetric photometer according to claim 1, wherein the deriving unit includes:
    a signal processing circuit that obtains a first signal value, a second signal value, and a third signal value expressing the intensities of the first signal, the second signal, and the third signal, respectively;
    a colorimetric value deriving unit that derives the colorimetric value from the first signal value, the second signal value, and the third signal value; and
    a photometric value deriving unit that calculates a weighted sum of the first signal value, the second signal value, and the third signal value using weight coefficients, and sets the weighted sum to the photometric value, the weight coefficients being selected such that spectral responsivity indicating a relation between the spectral intensity of the light to be measured and the weighted sum approximates to the spectral luminous efficiency.

4. The direct stimulus value reading type colorimetric photometer according to claim 3, wherein the colorimetric value deriving unit includes
    a stimulus value calculation unit that calculates a first weighted sum of the first signal value, the second signal value, and the third signal value using a first weight coefficient, calculates a second weighted sum of the first signal value, the second signal value, and the third signal value using a second weight coefficient, calculates a third weighted sum of the first signal value, the second signal value, and the third signal value using a third weight coefficient, and sets the first weighted sum, the second weighted sum, and the third weighted sum to a first component, a second component, and a third component, respectively, of a stimulus value corresponding to a case in which the color matching function is selected as an evaluation function for colorimetry, the first weight coefficient being selected such that spectral responsivity indicating a relation between the spectral intensity of the light to be measured and the first weighted sum approximates to the first part, the second weight coefficient being selected such that spectral responsivity indicating a relation between the spectral intensity of the light to be measured and the second weighted sum approximates to the second part, the third weight coefficient being selected such that spectral responsivity indicating a relation between the spectral intensity of the light to be measured and the third weighted sum approximates to the third part.

5. The direct stimulus value reading type colorimetric photometer according to claim 4, wherein the colorimetric value deriving unit further includes
    a colorimetric value calculation unit that calculates the colorimetric value from the stimulus value.

6. The direct stimulus value reading type colorimetric photometer according to claim 2, wherein the fourth signal indicates intensity of a dark current in the colorimetric optical system group.

7. The direct stimulus value reading type colorimetric photometer according to claim 1, wherein
    the colorimetric optical system group further includes a fourth colorimetric optical system,
    the fourth colorimetric optical system has spectral responsivity approximate to the spectral luminous efficiency,
    the fourth colorimetric optical system outputs a fourth signal having intensity depending on the spectral intensity of the light to be measured, and
    the deriving unit derives the colorimetric value and the photometric value from the first signal, the second signal, the third signal, and the fourth signal.

8. The direct stimulus value reading type colorimetric photometer according to claim 7, wherein the deriving unit includes:
a signal processing circuit that obtains a first signal value, a second signal value, a third signal value, and a fourth signal value expressing intensities of the first signal, the second signal, the third signal, and the fourth signal, respectively;
a colorimetric value deriving unit that derives the colorimetric value from the first signal value, the second signal value, the third signal value, and the fourth signal value; and
a photometric value deriving unit that calculates a weighted sum of the first signal value, the second signal value, the third signal value, and the fourth signal value using weight coefficients, and sets the weighted sum to the photometric value, the weight coefficients being selected such that spectral responsivity indicating a relation between the spectral intensity of the light to be measured and the weighted sum approximates to the spectral luminous efficiency.

9. The direct stimulus value reading type colorimetric photometer according to claim 8, wherein the colorimetric value deriving unit includes
a stimulus value calculation unit that calculates a first weighted sum of the first signal value, the second signal value, the third signal value, and the fourth signal value using a first weight coefficient, calculates a second weighted sum of the first signal value, the second signal value, the third signal value, and the fourth signal value using a second weight coefficient, calculates a third weighted sum of the first signal value, the second signal value, the third signal value, and the fourth signal value using a third weight coefficient, and sets the first weighted sum, the second weighted sum, and the third weighted sum to a first component, a second component, and a third component, respectively, of a stimulus value corresponding to a case in which the color matching function is selected as an evaluation function for colorimetry, the first weight coefficient being selected such that spectral responsivity indicating a relation between the spectral intensity of the light to be measured and the first weighted sum approximates to the first part, the second weight coefficient being selected such that spectral responsivity indicating a relation between the spectral intensity of the light to be measured and the second weighted sum approximates to the second part, the third weight coefficient being selected such that spectral responsivity indicating a relation between the spectral intensity of the light to be measured and the third weighted sum approximates to the third part.

10. The direct stimulus value reading type colorimetric photometer according to claim 9, wherein the colorimetric value deriving unit further includes
a colorimetric value calculation unit that calculates the colorimetric value from the stimulus value.

11. The direct stimulus value reading type colorimetric photometer according to claim 1, wherein
the colorimetric optical system group further includes a fourth colorimetric optical system,
the fourth colorimetric optical system has spectral responsivity approximate to the spectral luminous efficiency,
the fourth colorimetric optical system outputs a fourth signal having intensity depending on the spectral intensity of the light to be measured, and
the deriving unit derives the colorimetric value from the first signal, the second signal, and the third signal, and derives the photometric value from the fourth signal.

12. The direct stimulus value reading type colorimetric photometer according to claim 11, wherein the deriving unit includes:
a signal processing circuit that obtains a first signal value, a second signal value, a third signal value, and a fourth signal value expressing intensities of the first signal, the second signal, the third signal, and the fourth signal, respectively;
a colorimetric value deriving unit that derives the colorimetric value from the first signal value, the second signal value, and the third signal value; and
a photometric value deriving unit that derives the photometric value from the fourth signal value.

13. The direct stimulus value reading type colorimetric photometer according to claim 12, wherein the colorimetric value deriving unit includes
a stimulus value calculation unit that calculates a first weighted sum of the first signal value, the second signal value, and the third signal value using a first weight coefficient, calculates a second weighted sum of the first signal value, the second signal value, and the third signal value using a second weight coefficient, calculates a third weighted sum of the first signal value, the second signal value, and the third signal value using a third weight coefficient, and sets the first weighted sum, the second weighted sum, and the third weighted sum to a first component, a second component, and a third component, respectively, of a stimulus value corresponding to a case in which the color matching function is selected as an evaluation function for colorimetry, the first weight coefficient being selected such that spectral responsivity indicating a relation between the spectral intensity of the light to be measured and the first weighted sum approximates to the first part, the second weight coefficient being selected such that spectral responsivity indicating a relation between the spectral intensity of the light to be measured and the second weighted sum approximates to the second part, the third weight coefficient being selected such that spectral responsivity indicating a relation between the spectral intensity of the light to be measured and the third weighted sum approximates to the third part.

14. The direct stimulus value reading type colorimetric photometer according to claim 13, wherein the colorimetric value deriving unit further includes
a colorimetric value calculation unit that calculates the colorimetric value from the stimulus value.

15. The direct stimulus value reading type colorimetric photometer according to claim 1, wherein the first part, the second part, and the third part correspond to an x component, a y component, and a z component of the color matching function, respectively.

16. The direct stimulus value reading type colorimetric photometer according to claim 1, wherein the color matching function corresponds to a modified color matching function obtained by correcting a color matching function of an XYZ color system adopted in 1931 by International Commission on Illumination.

17. The direct stimulus value reading type colorimetric photometer according to claim 2, wherein the deriving unit includes:
a signal processing circuit that obtains a first signal value, a second signal value, and a third signal value expressing the intensities of the first signal, the second signal, and the third signal, respectively;

a colorimetric value deriving unit that derives the colorimetric value from the first signal value, the second signal value, and the third signal value; and a photometric value deriving unit that calculates a weighted sum of the first signal value, the second signal value, and the third signal value using weight coefficients, and sets the weighted sum to the photometric value, the weight coefficients being selected such that spectral responsivity indicating a relation between the spectral intensity of the light to be measured and the weighted sum approximates to the spectral luminous efficiency.

18. The direct stimulus value reading type colorimetric photometer according to claim 2, wherein the first part, the second part, and the third part correspond to an x component, a y component, and a z component of the color matching function, respectively.

19. The direct stimulus value reading type colorimetric photometer according to claim 2, wherein the color matching function corresponds to a modified color matching function obtained by correcting a color matching function of an XYZ color system adopted in 1931 by International Commission on Illumination.

20. The direct stimulus value reading type colorimetric photometer according to claim 3, wherein the first part, the second part, and the third part correspond to an x component, a y component, and a z component of the color matching function, respectively.

* * * * *